United States Patent [19]
Kayihan et al.

[11] Patent Number: 6,026,334
[45] Date of Patent: Feb. 15, 2000

[54] CONTROL SYSTEM FOR CROSS-DIRECTIONAL PROFILE SHEET FORMATION

[75] Inventors: Ferhan Kayihan, Tacoma, Wash.; Yaman Arkun, Atlanta, Ga.

[73] Assignee: Weyerhaeuser Company, Federal Way, Wash.

[21] Appl. No.: 08/902,306

[22] Filed: Jul. 29, 1997

Related U.S. Application Data

[60] Provisional application No. 60/022,772, Jul. 30, 1996.

[51] Int. Cl.[7] .................................................. G05B 13/02
[52] U.S. Cl. .............................................................. 700/28
[58] Field of Search ........................ 364/471.01, 471.02, 364/471.03, 469.01, 148, 149, 150; 702/85

[56] References Cited

U.S. PATENT DOCUMENTS

| | | | |
|---|---|---|---|
| 4,509,110 | 4/1985 | Levesque, Jr. et al. | 364/150 |
| 4,970,638 | 11/1990 | Yeh et al. | 364/150 |
| 5,519,605 | 5/1996 | Cawlfield | 364/151 |
| 5,550,732 | 8/1996 | Wang et al. | 364/149 |
| 5,568,400 | 10/1996 | Stark et al. | 702/85 |
| 5,680,304 | 10/1997 | Wang et al. | 364/149 |

OTHER PUBLICATIONS

A Robust Fault Diagosis Scheme based on Signal Modal Estimation, Jiang et al, Second IEEE Conference on Control Applications, Vancouver, B.C., pp. 873–878, Sep. 1993.

Singular–value–decomposition approach to multivariable generalised predictive control, Kouvaritakis et al, IEE Proceedings–D, vol. 140, No. 3, pp. 145–154, May 1993.

A Method for Robust Identification and Control of a Flexible Space Structure, Carroll, Proceedings of the 29th Conference on Decision and Control, Honolulu, Hawaii, pp. 611–616, Dec. 1990.

A Robust Influence Matrix Approach to Fault Diagnosis, Doraiswami et al, IEEE transactions on Control Systems Technology, vol. 4, No. 1, pp. 29–39, Jan. 1996.

*Primary Examiner*—William Grant
*Assistant Examiner*—Chad Rapp
*Attorney, Agent, or Firm*—Christensen O'Connor Johnson & Kindness PLLC

[57] ABSTRACT

A control system for calculating a number of output control signals for use in a continuous web paper making system. The control system receives a number of input signals from a plurality of sensors and reduces the number of inputs using a singular value decomposition based on a static model of the paper making system. The space of the inputs is further reduced using a principal component analysis of a moving window of values equal to the difference in the sensor values and an output of the static model of the paper making system. Once the space of the inputs is reduced, they are applied to a reduced order control system that calculates a reduced number of output control signals. The outputs of the reduced order control system are a function of the principal component analysis of the data in the moving window. The space of the output control signals is then increased using inverse transformations of the principal component analysis and the singular value decomposition before being applied to a plurality of actuators that control the paper making system.

2 Claims, 20 Drawing Sheets

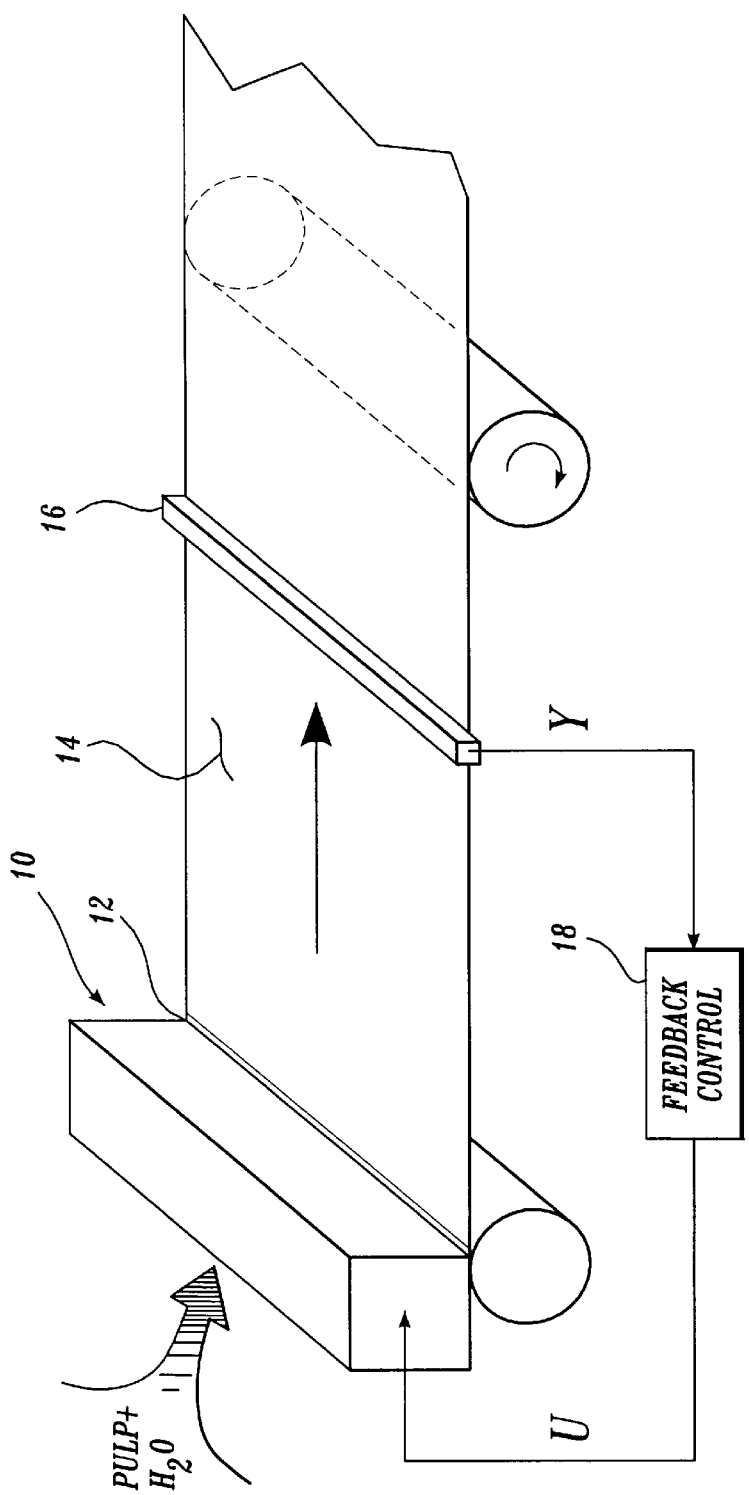

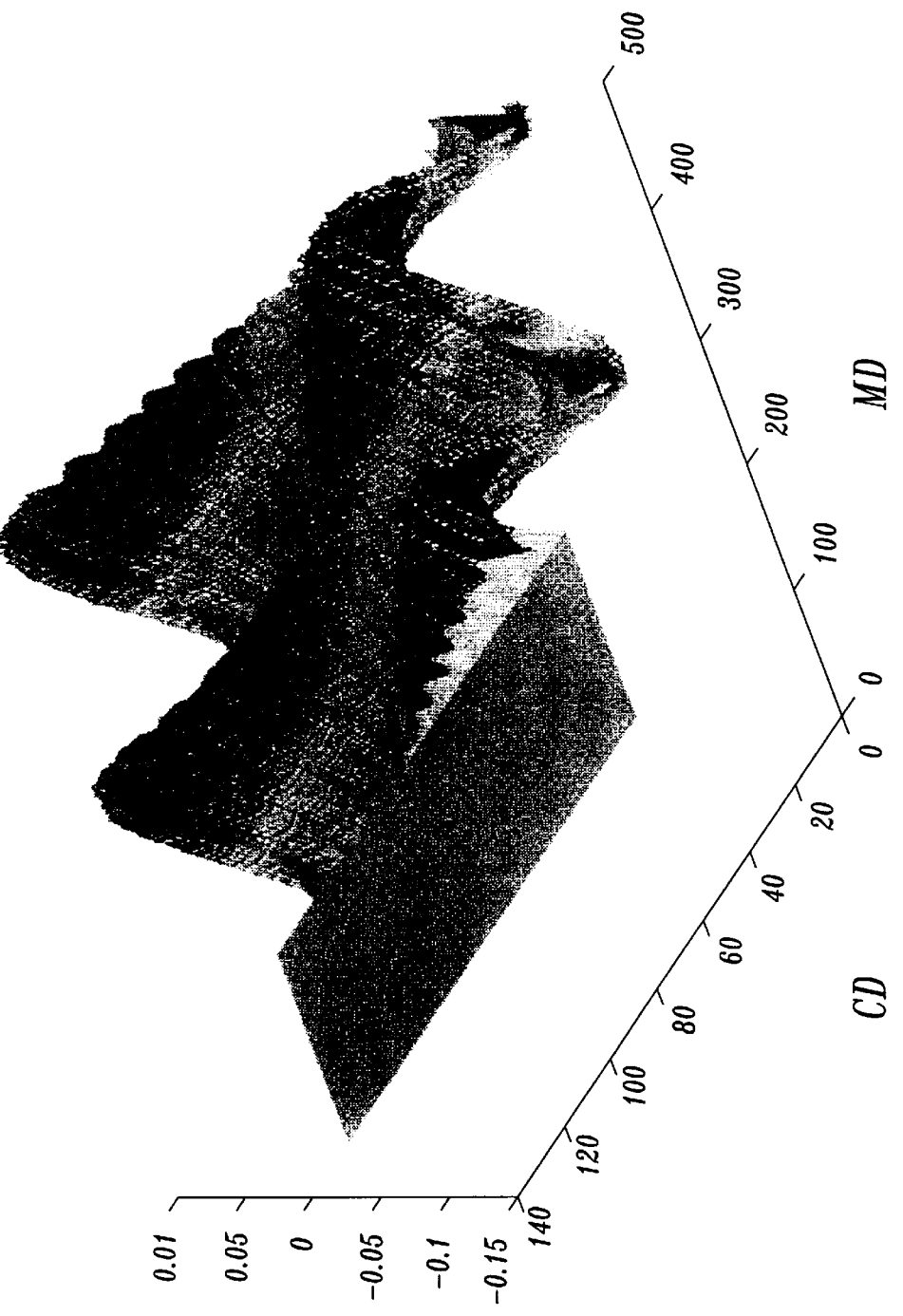

CONTROL SYSTEM FOR CROSS-DIRECTIONAL PROFILE SHEET FORMATION

This application claims the benefit of U.S. provisional application Ser. No. 60/022,722, filed Jul. 30, 1996.

FIELD OF THE INVENTION

The present invention relates to control systems in general and, in particular, to control systems for use in the pulp and paper industry.

BACKGROUND OF THE INVENTION

As manufacturing systems become increasingly automated, the control systems required to ensure the proper operation of such systems become correspondingly complex. In general, most control systems comprise a variety of sensors that provide measurements of a desired quantity to a computer processor. The processor in turn calculates the settings for a variety of actuators that change the operation of the system so that the sensors produce a desired reading.

As the number of sensors and actuators used in a manufacturing system increase, the numerical calculations that must be performed by the computer processor to calculate the proper actuator settings become increasingly complex. Therefore, a great deal of research and development has been directed to methods of simplifying the calculations that are required to compute the setting for the actuators. In the past, these simplified calculations used a fixed set of assumptions regarding the type of disturbances that may affect the operation of the manufacturing system. While this method works well for systems whose disturbances are well known, there are many situations where the type of disturbances cannot be predicted. Therefore the reduced model of the underlying system may be inaccurate.

Given the shortcomings in the prior art, there is a need for a control system that can perform control calculations for a large number of sensors and actuators in real time while simultaneously optimizing a reduced order model for the disturbances that actually occur.

SUMMARY OF THE INVENTION

The present invention is a control system that receives a number of inputs from a plurality of sensors disposed in a machine or process. The control system calculates a series of outputs that are used to control a plurality of actuators in order to produce desired signals at each of the sensors. The control system calculations rely on the inversion of a static model of the underlying machine or process. In the event of ill-conditioning arising from the conversion of large matrices, singular value decomposition is utilized.

The number of inputs is then reduced using a principal component analysis of a moving window of data created from the sensor signals. The moving window contains a number of vectors having values equal to the difference between sensor signals and an expected output as determined by the static model of the underlying machine or process. The moving window is decomposed by a principal component analysis (PCA) into a sum of outer products of orthonormal basis vectors and their corresponding vectors of coefficients. The matrix of orthonormal basis vectors is sued to reduce the number of inputs that are applied to the control system. The set of reduced inputs is applied to a reduced complexity control system that calculates the outputs in a reduced space. The reduced complexity control system, which is preferably designed according to Internal Model Control (IMC) principles, includes a reduced complexity model that is sensitive to variations in the operation of the underlying machine or process as determined by the principal components analysis of the moving window of sensor data. After calculating the reduced space outputs, the reduced space outputs are projected to the full space using the results of the PCA and, if necessary, the SVD.

The present invention therefore employs SVD, PCA and traditional linear controller design paradigms to formulate an improved control methodology that is particularly relevant for addressing the large scale cross directional control of sheet forming process.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a simplified illustration of a prior art, feedback controlled paper making process;

FIG. 2 illustrates the generic form of a control calculation that is performed by perfect prior art control systems;

FIGS. 11A–11C illustrates the mapping of control signals from the reduced space of the internal model controller to the space of the underlying process or system;

DETAILED DESCRIPTION OF THE PREFERRED EMBODIMENT

Figure 3:
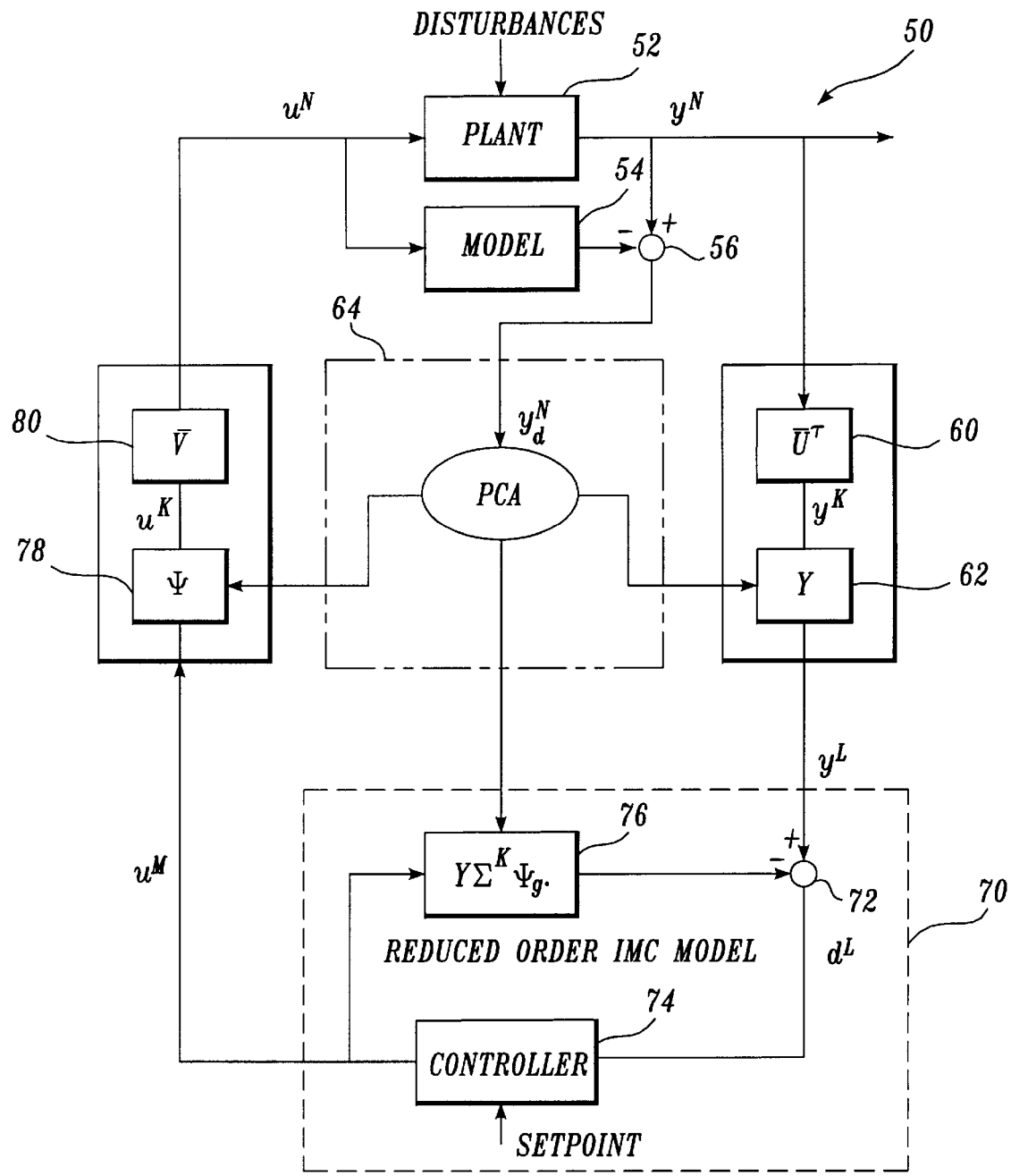
FIG. 3 illustrates a control system according to the present invention.

As indicated above, the present invention is a control system that can perform control calculations for a large number of sensors and actuators while simultaneously compensating for variations in the operation of the underlying machine or process.

FIG. 1 is a simplified diagram of a prior art paper making process. To make paper, a slurry of pulp and water is added under pressure to a head box 10. From the head box, the slurry flows through an opening of a slice lip 12 and onto a wire 14. The slice lip 12 generally comprises a flexible bar having a plurality of actuators disposed along the length of the bar. Each actuator controls the width of the slice lip at a position around the actuator. Opening and closing the actuators, locally cause the thickness of the slurry stream flowing from the head box to increase or decrease accordingly.

To control the operation of the paper making process, an array of sensors 16 is positioned downstream from the head box. The sensor 16 can measure a variety of conditions such as basis weight, web thickness, color, water content, etc. Readings from the sensors 16 are supplied as inputs to a feedback control system 18 that computes output control signals or settings that are applied to each of the actuators along the slice lip 12. Each actuator is adjusted by the control system so that the sensors 16 produce a desired reading.

In operation, the head box may be up to 30 feed wide and the paper sheet moves up to 60 mph. The array of sensors 16 may contain up to 400 individual sensor elements equally positioned along the width of the paper sheet. Given the number of sensors across the sheet, the number of actuators along the slice lip, as well as the speed at which the sheet is moving, the feedback control system 18 must calculate the control signals rapidly in order to assure that the paper making system operates properly under all conditions.

The general mathematical form of the calculations performed by the feedback control system 18 is shown in FIG. 2. Each of the individual sensor readings $Y_0, Y_1, Y_2 \ldots U_N$ that comprise the array of sensors 16 can be expressed as being equal to the setting of a corresponding actuator value $U_0, U_1, U_2 \ldots U_N$, along the width of the slice lip, multiplied by a matrix G of gain factors. For perfect control it is necessary to solve this equation for the appropriate actuator setting in order to achieve a desired sensor reading, by inverting the matrix G. As the number of sensors and actuators increases, the time required to invert the G matrix is prohibitively long even for high speed computer systems. In addition, the matrix G can be ill-conditioned, thereby when inverted, causing poor system performance.

To reduce the time required to calculate settings for a plurality of actuators from a corresponding set of sensor readings, a considerable effort has been devoted to finding methods of simplifying the calculation of the control signals. In general, these efforts have focused on reducing the size of the problem, i.e., the size of the matrices, so that the same result can be obtained with fewer calculations.

FIG. 3 is a block diagram of a control system 50 that is designed according to the present invention. As indicated above, the control system reduces the complexity of the computations that are performed to calculate the control signals while simultaneously responding to changes that may occur in the operation of the underlying machine or process.

The control system 50 controls the operation of an underlying process or system that is represented by a plant block 52. In the presently preferred embodiment of the invention, the plant block 52 represents the cross-directional behavior of a continuous web paper making process. However, the present invention can be utilized in other manufacturing systems as well.

The inputs to the plant, $u^N$, represent the control signals that are applied to the various actuators that control the operation of the plant. The outputs of the plant block 52, $y^N$, represent the readings produced by the various sensors disposed throughout the plant. As indicated above, these sensors can measure any desired value such as paper basis weight, web thickness, water content, color, etc. Although the description below assumes an equal number of sensors and actuators, this condition may not always be true or necessary for the claims to hold.

A fixed mathematical model 54 of the plant also receives the actuator input control signals $u^N$ and produces output signals that predicts how the plant will respond to the input values. The outputs of the model 54 as well as the output sensor values $y^N$, are fed to a differencing block 56 that produces a series of output values, $y_d^N$, having a value equal to the difference between the actual sensor values and the predicted output values that are produced by the fixed mathematical model 54. The output of the differencing block 56 therefore reflects how well the mathematical model 54 simulates the operation of the plant.

Under ideal conditions, the output of the differencing block 56 will be 0 thereby indicating that no changes are needed to the input values $u^N$ in order to produce a desired output value $y^N$ at each of the sensors. However, in practice, the plant block 52 is subject to a variety of disturbances that alter the operation of the plant. These disturbances may be caused by mechanical oscillations, changes in the raw materials applied to the process, upstream variations, random measurement noise variations, or random process variations, etc. It is the goal of the control system to selectively but judiciously react to these changes by modifying the control signals $u^N$ in order to compensate for the dominant disturbances.

As indicated above, when the control system receives N inputs and calculates N outputs, the time required to calculate the appropriate output signals can be prohibitive. To reduce the problem size, the present invention transforms a vector or array of N inputs into a set of K inputs, where K is less than N, by multiplying the N inputs by a matrix $\overline{U}^T$ fixed at a block 60. The matrix $\overline{U}^T$ is determined by a singular value decomposition from the fixed mathematical model 54 of the underlying system or process according to well known techniques. The matrix $\overline{U}^T$ is calculated "off-line", i.e., prior to the operation of the control system 50 and remains constant.

While the reduction in problem size obtained form the singular value decomposition at block 60 reduces the complexity of the calculations required, the size of the matrices can still be too large to compute the outputs for a plurality of actuators in real time. Therefore, the present invention performs a second transformation to reduce the number of entries in the vector or arrays of inputs from K to L, where K is greater than L. The second transformation occurs at block 62 and is performed by multiplying the vector of K sensor values by a matrix, Y, at block 62. The matrix Y, unlike the matrix $\overline{U}^T$, is not fixed but varies according to outputs of the differencing block 56, as will be described below.

Figure 4:
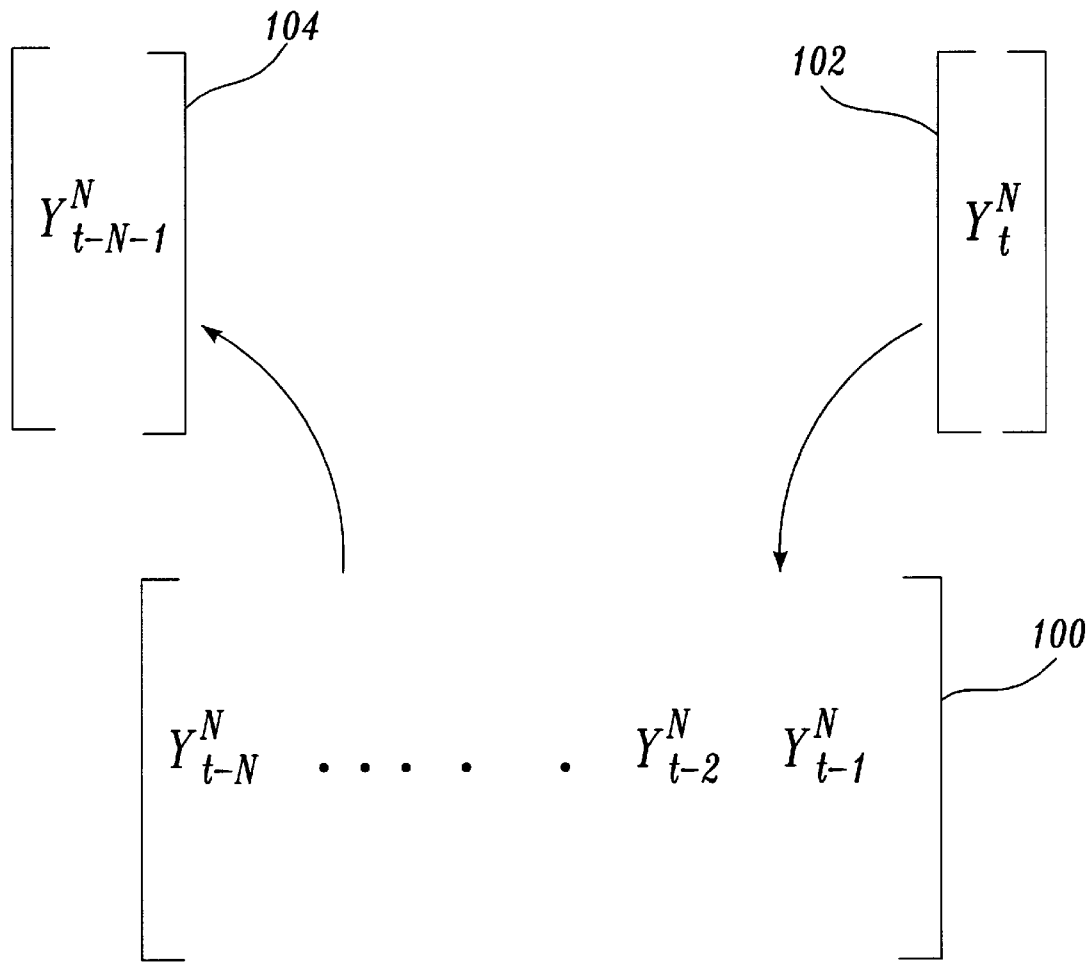
FIG. 4 illustrates how a moving window of sensor values is compressed using principal component analysis according to an aspect of the present invention.

The outputs of the differencing block 56 are applied to a principal component analysis block 64 that operates to isolate those variations in the sensor signals that can be controlled versus those caused by random noise. The operation of the principal component analysis block is shown in FIG. 4. A window 100 comprises a sequence of N successive vectors of outputs, $y_d^N$, produced by the differencing block 56. At each new sampling interval, a new vector of outputs 102 is added to the window 100 and the oldest vector of output values 104 is removed.

The information contained in the window 100 can be represented as a series of orthogonal basis functions, $\Phi$, multiplied by scalar variables, $d_t$, as described by Equation 16, set forth below. The more terms contained in the series, the better the series approximates the information contained in the window 100. For the purposes of the present invention, the series is limited so that a user definable amount such as 90% of the information in the window is retained. The information retained represents the change in the sensor values that can be affected using the control system of the present invention, while the remaining amount is discarded.

Returning now to FIG. 3, once the orthogonal basis functions $\Phi$ and scalar values $d_t$ have been determined, they are combined in a matrix Y. The matrix Y is multiplied with the K inputs that are determined from the block 60 in order to further reduce the size of the mathematical problem according to Equation 23 described below. The output of block 62 reduces the number of inputs to the control system from K to L, from which the control signals for the plant block 52 can be computed in real time by a general purpose central processing unit or digital signal processor.

Once the number of inputs has been reduced, the L inputs are applied to a more simplified control system 70 such as a reduced order internal model control system. The reduced order control system comprises a control algorithm 74 that produces control signals from a set of inputs, a reduced order effective process model 76 of the control algorithm 74 and a differencing block 72. The L outputs produced by the block 62 are applied to one input of a differencing block 72 while the outputs produced by the reduced order effective process model 76 are applied to the other input of the differencing block. The outputs of the differencing block 72 are applied as the inputs to the control algorithm 74 that is designed according to Equation 25, as described below. The control algorithm 74 produces a reduced number of output control signals, $u^M$, that are fed back to the actuators to control the operation of the plant block 52 so that the sensors that monitor the operation of the underlying system or process will produce readings equal to a reduced order set point. The set point may request a desired paper basis weight thickness, color, water content, etc.

The output control signals produced by the control algorithm 74 are also supplied as inputs to the reduced order effective process model 76 of the control algorithm 74.

The reduced order effective process model 76 of the control algorithm 74 is defined according to Equation 24 described below. As can be seen, the reduced order effective process model 76 is dependent upon the results of the principal component analysis determined in block 64 as described above and, therefore, is optimized to the disturbances that are actually occurring in the underlying machine or process.

The space or number of output control signals, $u^M$, produced by the control algorithm 74 is transformed at block 78 by multiplying the signals by a matrix $\Psi$ that is calculated as a function of the principal component analysis as set forth in Equation 18 described below. The effect of block 78 is to increase the number of control signals from M to K, where K is greater than M.

After increasing the space of the output control signals from M to K, the space of the output control signals is increased again by multiplying, at a block 80, the K outputs by a matrix $\overline{V}$ that is determined by the singular value decomposition of the fixed mathematical model 54 of the plant block 52. As indicated above, the matrix $\overline{V}$ remains static and is computed off-line prior to the operation of the control system 50. The outputs of the block 80 are the N output control signals that drive the various actuators of the plant block 52 to respond to any disturbances.

As can be seen from the above description, the control system of the present invention allows the output control signals of the plant to be calculated in a reduced space, i.e., by using fewer calculations using the combination of the singular value decomposition as well as the principal component analysis. In addition, because the reduced order control system operates as a function of the principal component analysis, the control system is optimized in response to the disturbances that actually occur.

Having described the control system of the present invention in general terms, the following is a more detailed, mathematical description of the present invention.

The Method

In this work we are interested in full profile cross direction control of continuous sheet forming processes. The full profile refers to the evolution of the sheet properties in 2-dimensions, i.e., spatially across the sheet and temporally along the direction the sheet moves. Early attempts have assumed that the disturbance profile can be separated into three components: a moving direction (MD) only, a cross direction (CD) only, and a residual. Subsequently MD and CD components were controlled separately using different types of CD and MD actuators (Wilhelm and Fjeld, 1983; Wilhelm, 1984; Taylor, 1991). Here we address the CD control only. Therefore it is assumed that the full profile does not include any MD variation. Conforming with the traditional definition this means that the spatial mean of all our CD profiled are zero. We also assume that the full profile is directly measured by a fixed array of sensors. This new measurement technology (e.g., see Francis et al. 1988, anon. 1993) is finding its way through many production facilities and offering a unique opportunity to improve the existing estimation and control algorithms which utilize scanners. In the sequel we will introduce the design method using the paper machine as an example for sheet forming processes without any loss of generality.

Consider a paper machine with N CD measurement boxes and N CD actuators. The theory applies to non-square systems as well with minor modifications. The discrete-time model is given by $$y_t^N = g(q^{-1})Gu_t^N + y_{d_t}^N \qquad (1)$$

where linearity was assumed. The vectors $y_t^N$, $U_t^N$ and $Y_{d_t}^N$ represent the output, the control input and the effect of external disturbances on the output, respectively. Throughout the paper the superscript will denote the size of the vector. Therefore the input-output vector space for the original plant has dimension N. The matrix G is the steady-state gain matrix between the slice lips and the CD measurements. It is usually assumed that the dynamics between the actuators and the measurements are all equal and given by a scalar transfer function $g(q^{-1})$ which is typically first order with a time delay (e.g., see Krisstinson and Dumont, 1996). $q^{-1}$ is the backwardshift operator.

it follows from (1) that "perfect control"

(i.e. $y_t^N = 0$)

is obtained if the control action satisfies the following design equation:

$$-g(q^{-1})u_t^N = G^{-1} y_{d_t}^N \qquad (2)$$

There are two major problems associated with this expression. First of all, its solution $$u_t^N$$

requires the inversion of the model dynamics i.e., $$u_t^N = -g^{-1}(q^{-1})G^{-1} y_{d_t}^N \qquad (3)$$

For non-minimum phase systems exact inverse $g^{-1}(q^{-1})$ is unstable and/or non-causal; therefore, "perfect control" is not feasible. However one can approach it in an optimal way by computing an approximate inverse. This is the approach taken in Internal Model Control (IMC) (Morari and Zafiriou, 1989). For example for step distrubances the $H_2$-optimal solution to (2) is given by:

$$u_t^N = -g_-^{-1}(q^{-1})G^{-1} y_{d_t}^N \qquad (4)$$

which gives the closed-loop response:

$$y_t^N = [1 - g_+(q^{-1})] y_{d_t}^N \qquad (5)$$

where $g_-$ and $g_+$ are the minimum and non-minimum phase parts of $g(q^{-1})$, respectively. For paper machines and other sheet forming processes the steady-state gain matrix G usually has a large dimension and condition number. Consequently the control law (4) introduces numerical problems, aggressive control action and sensitivity to uncertainty, all of which are known to limit the achievable closed-loop performance. The present invention alleviates these problems associated with the inversion of G. In the analysis to follow the control action (4) is never implemented as given but serves as a target that is approximated by a series of projection and order-reduction techniques which are explained next.

Input-Output Conditioning

To get around the problem of ill-conditioning, first a singular value decomposition (SVD) of $G \in R^{N \times N}$ is obtained:

$$G = U\Sigma V^T \qquad (6)$$

where $\Sigma$ is the diagonal matrix of N singular values; U and V are N×N unitary matrices containing left and right singular vectors, respectively. Next $\Sigma$ is partitioned, i.e., $$\Sigma = \begin{bmatrix} \Sigma^K & 0 \\ 0 & \Sigma^{(N-K)} \end{bmatrix} \qquad (7)$$

such that $\Sigma^K$ contains the largest K singular values in descending order. The value K is chosen either using a threshold value for the minimum singular value to be retained in $\Sigma^K$ or based on a criterion to be given later.

Figure 5:
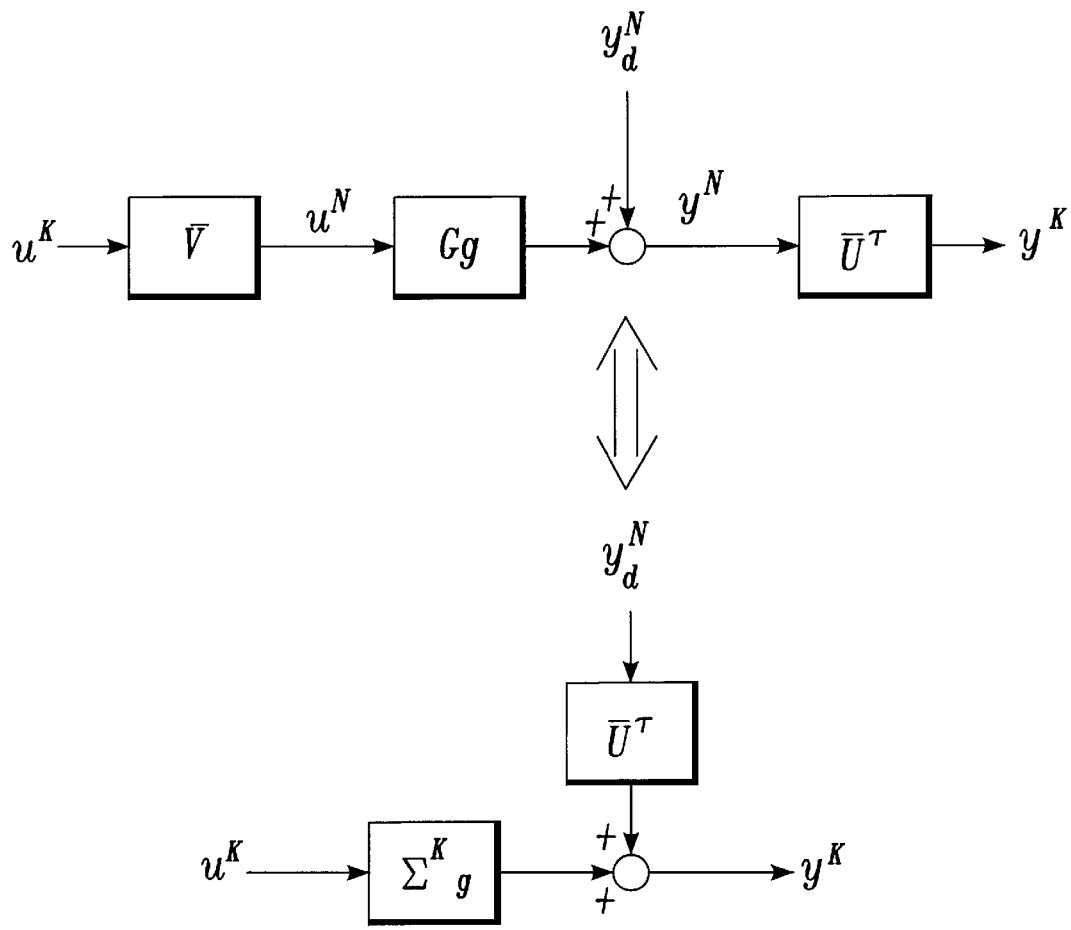
FIG. 5 illustrates two equivalent mapping representations of the open-loop-dynamics of the control system of the present invention in a reduced subspace determined by a singular value decomposition.

From (6) to (7) it follows that $\Sigma^K = \overline{U}^T G \overline{V}$ where $\overline{U} \in R^{N \times K}$ and $\overline{V} \in R^{N \times K}$ are the first K left and right singular vectors of G, respectively. Next the dimension of the input-output map G is reduced from N to K by eliminating the least significant input-output directions corresponding to the smallest (N-K) singular values. The new gain matrix is given by:

$$\overline{U}^T G \overline{V} = \Sigma^K \qquad (8)$$

which has a smaller condition number than G. The open-loop response of the original system in the reduced subspace is governed by:

$$y_t^K = g(q^{-1}) \Sigma^K u_t^K + \overline{U}^T y_{d_t}^N \qquad (9)$$
$$= g(q^{-1}) \Sigma^K u_t^K + y_{d_t}^K$$

with its block diagram shown in FIG. 5. The matrices $\overline{U}$ and $\overline{V}$ act as transformations between the inputs and outputs of the original and reduced subspaces, $$(u_t^N, y_t^N, y_{d_t}^N) \text{ and } (u_t^K, y_t^K, y_{d_t}^K)$$

respectively with $$u_t^N = \overline{V} u_t^K \qquad (10)$$
$$y_t^K = \overline{U}^T y_t^N \qquad (11)$$
$$y_{d_t}^K = \overline{U}^T y_{d_t}^N \qquad (12)$$

The term $$\overline{U}^T y_{d_t}^N \in R^K$$

denotes the projection of the original disturbance effect onto the output space of the "conditioned" plant, and the corresponding "perfect control" action is the solution to the following reduced design equation (compare with Equation 2):

$$-g(q^{-1}) u_t^K = (\Sigma^k)^{-1} \overline{U}^T y_{d_t}^N \qquad (13)$$

After $g(q^{-1})$ is inverted as in IMC and the control action $u^K$ is computed from (13), it is mapped back to its original dimension via transformation (10) and implemented on the original plant. Comparing (13) with (3), it is clear that the disturbances are uncontrolled along the directions that are not spanned by the "conditioned" plant. Therefore some performance loss for the original plant outputs $y_{d_t}^N$ is inevitable when a reduced order controller is used. However this loss will not be significant, if the subspace dimension K is chosen such that the uncontrollable directions correspond to the smallest (least effective) singular values.

When choosing K, in addition to specifying a threshold for the minimum singular value or an upper bound on the desired condition number, we also check a relative reduction error defined by $$RRE = \frac{\bar{\sigma}(G \cdot \hat{G})}{\bar{\sigma}(G)} \quad (14)$$

where $\bar{\sigma}$ is the maximum singular value and $\hat{G}$; is the "effective" gain matrix for the original system after the inputs and outputs are transformed from $(u_t^K, y_t^K)$ to $(u_t^N, y_t^N)$ This quantity is computed as follows. Since it holds that $$y_t^K = g(q^{-1})\Sigma^K u_t^K; \quad y_t^N = (\bar{U}^T)^\dagger y_t^K; \quad u_t^K = (\bar{V})^\dagger u_t^N$$

where "$\dagger$" is the pseudo-inverse, one gets $$y_t^N = g(q^{-1})(\bar{U}^T)^\dagger \Sigma^K (\bar{V})^\dagger u_t^N \Rightarrow \hat{G} = (\bar{U}^T)^\dagger \Sigma^K (\bar{V})^\dagger \quad (15)$$

EXAMPLE 1

Figure 6A:
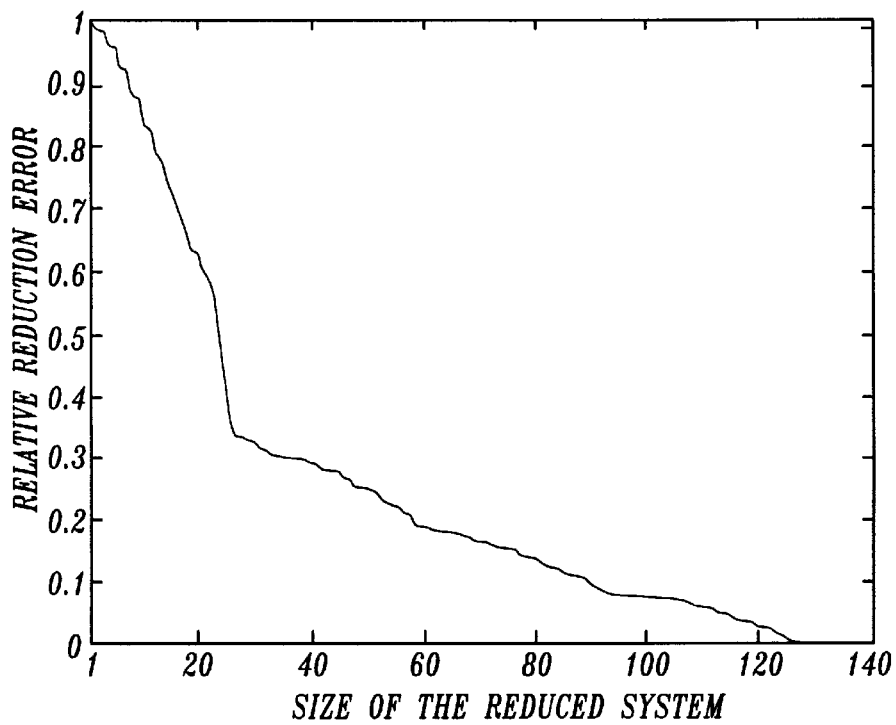
FIGS. 6A–6B illustrate a trade off between the condition number and RRE as the function of the size of the reduced subspace.
Figure 6B:
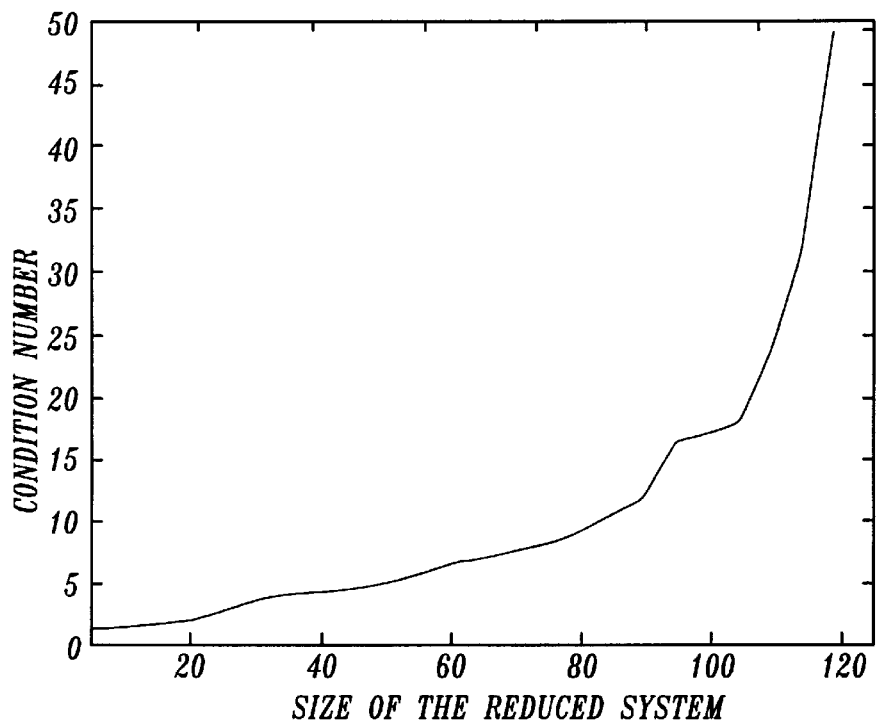

G is given by a 125×125 Toeplitz symmetric matrix:
G=Toeplitz[1 0.9 0.7 0.8 0.6 −0.5 −0.4 −0.2 −0.2 −0.1 −0.1 −0.05 −0.05]
with main diagonal elements equal to one, first upper and lower diagonal elements equal to 0.9 etc. The condition number of G is equal to 1.9453e+05. The trade-off between the condition number and RRE as a function of the system size K is shown in FIG. 6. The condition number decreases as the size of the reduced system $\Sigma^K$ gets smaller. However this occurs at the expense of higher RRE. For this system a modest reduction in size (i.e., K=75) results in a significantly smaller condition number (6.85) and at the same time the incurred relative reduction error is kept less than 20%. Naturally G could be conditioned more but this would result in unacceptable closed-loop performance as we start removing the significant singular values and directions. Although the size of the reduced system will be finalized pending further evaluation under closed-loop, the joint use of condition number and RRE is still very useful in creating promising reduced order systems for controller design.

Controller Design

So far we have projected the original system's inputs and outputs onto a "conditioned" subspace by introducing the necessary variable transformations. For most problems the condition number will become acceptable after a relatively small reduction in the size of G. Consequently controller design will still have to be carried out on a large system since further reduction can adversely affect performance. For this reason we explore other means of order reduction without jeopardizing the closed-loop performance.

For the "conditioned" system (9), we will demand that only the dominant modes of disturbances be rejected. We will show that is effectively leads to a lower dimensional output space in which disturbance rejection can take place. In addition we will approximate the control input profile in a lower dimensional space as well. The final IMC design will be performed in this reduced input-output subspace and the computed control action will be mapped back to its original dimension and implemented on the plant. It will be shown that usually the dimension of the subspace for IMC design is significantly lower than that of the original plant, thus justifying the method. Finally the controller will be truly adaptive since its structure and parameters will be modified in response to changes in the characteristics of the significant disturbance modes. All these points will be made more precise in the following development.

Construction of the Subspace for Controller Design

For the "conditioned system" (9), the projected disturbance effect can be expressed in terms of some orthogonal basis vectors $\phi^{(i)} \in R^{K \times 1}$ and scalar coefficients $d_t^{(i)}$ by the following expansion:

$$y_{d_t}^K = \sum_{i=1}^{L} \phi^{(i)} d_t^{(i)} + \sum_{i=L+1}^{K} \phi^{(i)} d_t^{(i)} = \Phi d_t^L + \Phi_{res} d_{res_t}^{K-L} \quad (16)$$

where $\Phi = [\phi^{(1)} \phi^{(2)} \ldots \phi^{(L)}] \qquad \Phi_{res} = [\phi^{(L+1)} \ldots \phi^{(K)}]$ $d_t^L = [d_t^{(1)} d_t^{(2)} \ldots d_t^{(L)}]^T \qquad d_{res_t} = [d_t^{(L+1)} d_t^{(L+2)} \ldots d_t^{(K)}]^T$ We will define the significant disturbance modes (L of them) by $d_t^L$ and the residual modes by $d_{res_t}^{K-L}$. The controller design Equation (13) is modified accordingly to retain only the significant part of the disturbance projection:

$$-g(q^{-1})u_t^K = \Sigma^{K-1} \Phi d_t^L \quad (17)$$

Next to reduce the size of the design space for the control inputs, Equation (17) is expanded in terms of new basis vectors $\psi^{(i)} \in R^{K \times 1}$ and coefficients $u_t^{(i)}$:

$$-g(q^{-1})u_t^K = \Sigma^{K-1} \Phi d_t^L = \left[ \sum_{i=1}^{M} \psi^{(i)} u_t^{(i)} + \sum_{i=M+1}^{M} \psi^{(i)} u_t^{(i)} \right] \quad (18)$$
$$= [\Psi u_t^M + \Psi_{res} u_{res_t}^{K-M}]$$

$\Psi = [\psi^{(1)} \ldots \psi^{(M)}] \qquad \Psi_{res} = [\psi^{(M+1)} \ldots \psi^{(K)}]$ $u_t^M = [u_t^{(1)} u_t^{(2)} \ldots u_t^{(M)}]^T \qquad u_{res_t} = [u_t^{(M+1)} u_t^{(M+2)} \ldots u_t^{(K)}]^T$ The significant input modes (M of them) are denoted by $\Psi u_t^M$, and the residual input modes by $\psi_{res} u_{res_t}^{K-M}$. Retaining only the significant modes, Equation (17) is modified to:

$$-g(q^{-1})u_t^K = \Psi u_t^M \qquad (19)$$

or after stable and causal inversion of the dynamics, one obtains the mapping between the input $$u_t^K$$

and its lower dimensional projection $$u_t^M:$$

$$u_t^K = -g_-^{-1}(q^{-1})\Psi u_t^M \qquad (20)$$

So far we have defined the following set of control inputs and disturbance effects and relationships between their respective subspaces:

$$u_t^N \overset{(10)}{\Longleftrightarrow} u_t^K \overset{(20)}{\Longleftrightarrow} u_t^M \quad N > K > M \qquad (21)$$

$$y_{d_t}^N \overset{(12)}{\Longleftrightarrow} y_{d_t}^K \overset{(16)}{\Longleftrightarrow} d_t^L \quad N > K > L$$

The IMC controller design will now be carried in the input-output subspace that has the smallest dimensions, i.e., for the pair $$(u_t^M, d_t^L).$$

First the input-output model in this design subspace needs to be determined. Starting with Equation (9)

$$y_t^K = g(q^{-1})\Sigma^K u_t^K + y_{d_t}^K$$

and substituting Equation (20), one gets $$y_t^K = -g_+(q^{-1})\Sigma^K \Psi u_t^K + y_{d_t}^K \qquad (22)$$

Since K>M (i.e., more outputs than control inputs) we seek a lower dimensional output space for disturbance rejection. Therefore we project the output to a lower dimensional vector space by:

$$y_t^P = Y y_t^K \qquad (23)$$

$$y_t^P = -g_+(q^{-1})Y\Sigma^K \Psi u_t^M + Y y_{d_t}^K$$

Now one has to determine the dimension P and the transformation matrix $Y \in R^{P \times K}$. Let P=L (i.e., the size of the output space for disturbance rejection the number of disturbance modes to be rejected), and M=L (i.e., the number of inputs=the number of significant disturbance modes). Also assume that Y is constructed from the significant disturbance modes by $Y=(\Phi^T\Phi)^{-1}\Phi^T$. Then it is easy to show that rejection of the significant modes takes place via an IMC design performed in the transformed subspace $$(u_t^L, d_t^L).$$

Figure 7:
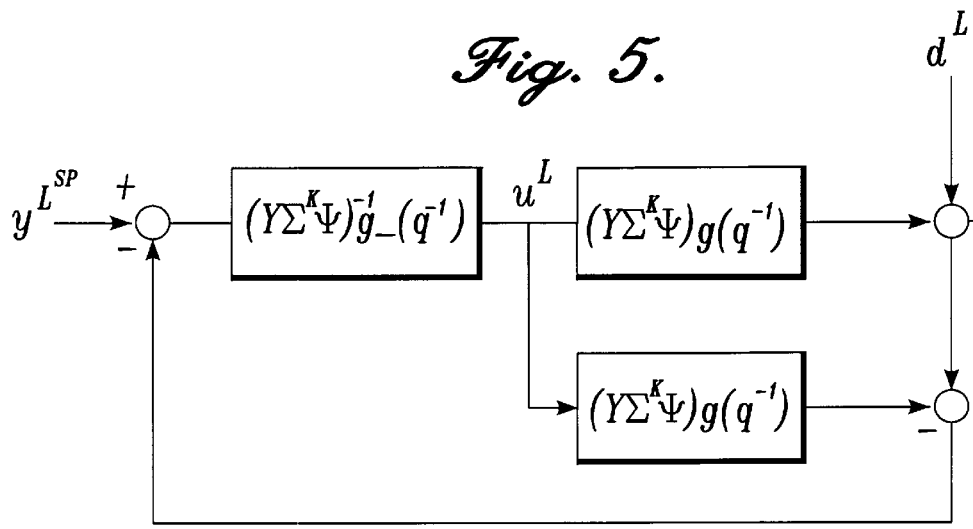
FIG. 7 is a block diagram illustrating the design of the internal model control system in a reduced subspace determined by the principal component analysis.

The resulting IMC diagram is shown in FIG. 7. This can be seen as follows.

With P=M=L the open-loop response for the projected output is given by:

$$\begin{aligned} y_t^L &= -g_+(q^{-1})Y\Sigma^K \Psi u_t^L + Y y_{d_t}^K \qquad (24) \\ &= -g_+(q^{-1})Y\Sigma^K \Psi u_t^L + (\Phi^T\Phi)^{-1}\Phi^T(\Phi d_t^L + \Phi_{res}d_{res_t}^{K-L}) \\ &= -g_+(q^{-1})Y\Sigma^K \Psi u_t^L + d_t^L \end{aligned}$$

where the last equality follows from orthogonality. Therefore the inverse control law:

$$u_t^L = (Y\Sigma^K \Psi)^{-1} d_t^L \qquad (25)$$

rejects the disturbance modes $d_t^L$ which results in the classical IMC performance for the output in the design subspace:

$$y_t^L = [1 - g_+(q^{-1})]d_t^L \qquad (26)$$

The performance for the output in the space of the "conditioned" plant can be similarly derived to be:

$$y_t^L = \left[I - g_+(q^{-1})\Sigma^K\Psi(Y\Sigma^K\Psi)^{-1}Y\right]\Phi d_t^L + \Phi_{res}d_{res_t}^{K-L} \qquad (27)$$

To obtain Equation (27), we have mapped the designed input $$u_t^L \text{ to } u_t^K$$

via transformation (20). It is noted again that the performance of the original plant output $$y_t^N$$

will be "close" to the design performance (27) if all the significant singular values and directions are retained in the "conditioned" plant. Therefore, we do not give the closed-loop expression for $$y_t^N$$

but will evaluate it in our simulations.

Equation (27) indicates that by this design procedure we choose to leave the insignificant disturbance modes $d_{res_t}$ completely unattenuated and spend the control effort in rejecting only the significant modes $$d_t^L.$$

If we had designed a full K×K IMC controller, the closed-loop performance would have been:

$$y_t^K = [I \cdot g + (q^{-1})I](\Phi d_t^L + \Phi_{res} d_{res_t}^{K-L})  \quad (28)$$

Comparison with (27) reveals that is controller tries to reject the insignificant disturbance modes as well. The performance loss incurred by the reduced order controller is due to the term $$\Sigma^K \Psi (Y \Sigma^K \Psi)^{-1} Y$$

introduced by projection and order reduction. The closer this term is to identity the less the difference between the reduced and full controllers. Obviously in the limiting case of no reduction (K=L), this term becomes identity and the two performances are identical.

Finally, it should be noted that the dimension of the reduced input space (M) determined by the number of significant input modes does not have to be equal to the number of significant disturbance modes (L). In the above analysis one would simply replace the inverses with pseudo-inverses and design either a least-squares (if M<L) or minimum input-norm (if M>L) IMC controller.

In the next section we discuss the computation of the modes and the basis functions used in the expansions of disturbance and control input profiles.

Identification of Significant Disturbance and Input Modes

The dimension of the reduced order controller depends on the number of significant disturbance modes which are to be rejected and the number of input modes which are used to span the optimal control action. Here we discuss how to select these modes on-line. We use a particular Principal Components Analysis (PCA) technique, known as the Karhunen-Loeve (KL) expansion. In our earlier work (Rigopoulos et al. 1996a and 1996b) we have used the KL expansion for identification of disturbance profiles only, in this paper we use it in the context of closed-loop control. Therefore only a brief summary, of the KL expansion is presented here.

The Karhunen-Loeve Expansion

The Karhunen-Loeve expansion is originally developed in a probability space to expand random functions as linear combinations of orthogonal basis functions with uncorrelated random coefficients (Karhunen, 1947; Loeve, 1955). The technique has found many application, some of which are in modeling and control of distributed parameter systems (Gay and Ray, 1988; 1995; Chen and Chang, 1992; Chakravarti et al. 1995, Park and Cho, 1996), pattern recognition and image analysis (Savoji and Burge, 1985; Ogawa and Oja, 1986), model identification of catalytic surface reactions (Krischer et al., 1993), and low dimensional modeling in turbulent flow (Berkooz et al., 1993; Sirovich and Everson, 1992).

Consider a paper machine with N CD positions, and suppose that we have access to N CD measurements at Q time intervals or MD positions (N<Q). These measurements are stored in a matrix Z of size N×Q where each column vector contains the full CD profile corresponding to a particular sampling time k. The KL analysis first mean-centers the data by subtracting the temporal average from each CD lane or row of Z to form a time-averaged matrix $\bar{Z}$. Next the elements of the two-point spatial correlation matrix K are computed from:

$$K(i,j) = \frac{1}{Q}\sum_{k=1}^{Q} \bar{Z}(i,k)\bar{Z}(j,k) \quad i,j = 1, \ldots, N \quad (29)$$

Let $\{\phi^{(n)}\}$ be the eigenvectors of K (also called the spatial modes). Then, the discrete KL expansion of the data can be written as a linear combination of the eigenvectors of K, with the coefficients of the expansion $\{a_n\}$ being uncorrelated random variables on that space, i.e., $$\bar{z}(k) = \sum_{n=1}^{N} a_n(k)\varsigma^{(n)} \quad (30)$$

The column vector $\bar{z}$ is the time-averaged CD profile at time k. The stochastic evolution of this CD profile is attributed to the temporal modes $\{a_n\}$ which can be computed from:

$$a_n(k) = \bar{z}(k)^T \varsigma^{(n)} \quad (31)$$

It also follows that each eigenvalue $\lambda_n$ of K represents the mean energy or variance explained along the direction of each eigenvector of K with the total mean energy $$E = \sum_n \lambda_n.$$

Furthermore among the class of all linear decompositions, the KL method is optimal in the sense that the KL expansion $$\bar{z}(k) = \sum_{n=1}^{L} a_n(k)\varsigma^{(n)}$$

on a subspace of lower dimension L<N retains the most average energy possible. In other words the %-variance, $$100 \times \frac{\sum_{n=1}^{L} \lambda_n}{\sum_{n=1}^{N} \lambda_n}$$

is maximized. In practical applications specifying a desired level of %-variance (e.g., 90%), one can compute the number of significant modes necessary to meet the desired accuracy. The KL expansion including only the first L modes will extract the main features (to the given accuracy) from the data and projection to lower dimension "filters" the random noise along with other insignificant modes.

Expansions (16) and (18) can now be interpreted as KL expansions where $(d_t^{(i)}, u_t^{(i)})$ are the temporal modes and $(\phi^{(i)}, \psi^{(i)})$ are the spatial eigenvectors of the disturbance and optimal control input profiles. If data are collected under open-loop conditions, the disturbance effect $$y_{d_t}^N$$

corresponds to the full profile measurement. In that case we apply the KL analysis to the projected disturbance profile $$y_{d_t}^K = \overline{U}^T y_{d_t}^N.$$

The significant modes $$d_t^L$$

are picked to satisfy a desired level of %-variance as discussed above. If data are collected under closed-loop (see on-line implementation below), we first subtract the modeled effect of control inputs from the measurements to infer the disturbance profile $$(\text{i.e., } y_{d_t}^N = y_t^N - Gg(q^{-1})u_t^N)$$

and then the KL analysis is applied to the projection of this residual given by $$y_{d_t}^N = \overline{U}^T [y_t^N - Gg(q^{-1})u_t^N].$$

The control input modes are computed in a similar fashion using the KL expansion (18). In essence what we have done is to compute the most significant modes of the control action which are used to annihilate the most significant modes of the disturbances. Once these modes are determined, the reduced-order IMC design can be carried in the subspace of these input-output modes. The input-output model which is needed for IMC design is given by $Y\Sigma^K\Psi_g$ $(q^{-1})=(\Phi^T\Phi)^{-1}\Phi^T\Sigma^K\Psi_g(q^{-1})$. This model can be easily computed since $\Phi$ and $\Psi$ are the eigenvectors of the correlation matrices used in the KL expansion of disturbances and optimal control action, respectively.

Controller Adaptation and On-line Implementation

In the literature the KL expansion has been exclusively used off-line for batch analysis. In an on-line situation, the KL procedure needs to be automated to take advantage of the new measurements becoming available at each sampling time. Also, old data should be discarded as their importance in predicting subsequent disturbance profiles is minimal, and many prohibit the KL method to quickly identify a change in the profile. Therefore we use a trailing window estimator where at each sampling time k, the KL expansion is applied to a data matrix Z of size N×W where W denotes the number of past CD profiles contained in the window. From one sampling time to another the data matrix Z is updated by incorporating the most recent data vector and dropping the oldest one, and the KL expansion is repetitively applied. The window size W is treated as a tuning parameter. Also exponential weighting (spatially uniform) can be applied to each column vector of Z to forget the influence of older data so that the KL expansion can quickly adapt to new profile patterns. For details the reader is referred to (Rigopoulos et al., 1996a and 1996b).

Since both the number and the numerical values of significant modes as identified by the KL analysis can change from one sampling time to another, the controller will have to automatically adapt to these changes. Specifically recalling the control law (25):

$$u_t^L = (Y\Sigma^K\Psi)^{-1}d_t^L$$

-continued
$$= [(\Phi^T\Phi)^{-1}\Phi^T\Sigma^K\Psi]^{-1}d_t^L$$

$$= K_c d_t^L$$

it is clear that both the size and parameters of the controller gain $K_c$ can change as different modes, $\Phi$ and $\Psi$, become dominant at different sampling times. In addition to the control law, some of the transformation operators between the original and lower dimensional inputs and outputs will also be updated as we have constructed them from the spatial eigenvectors. Specifically the transformations that get updated are $\Psi$ used in input transformation:

$$u_t^K = -g_-^{-1}(q^{-1})\Psi u_t^M$$

and $\Phi$ used in the output projection:

$$y_t^L = Y y_t^K = (\Phi^T\Phi)^{-1}\Phi^T y_t^K$$

The final adaptive closed-loop implementation is shown in FIG. 3. The IMC design occurs in a significantly lower dimension and the controller gets updated as it is deemed necessary by the time-varying disturbances. Transformations $\overline{V}$ and $\overline{U}$ are obtained from SVD and fixed. The PCA computes $\Psi$ and Y on-line and updates the controller accordingly.

A simulation Example

We consider a paper machine with 125 actuators and CD measurement positions. The plant is described by (1):

$$y_t^N = g(q^{-1})Gu_t^N + y_{d_t}^N$$

The steady state gain matrix G is the one studied in Example 1. The transfer function is first-order with delay:

$$g(q^{-1}) = \frac{q^{-3}}{1 - 0.1q^{-1}}$$

Figure 8:
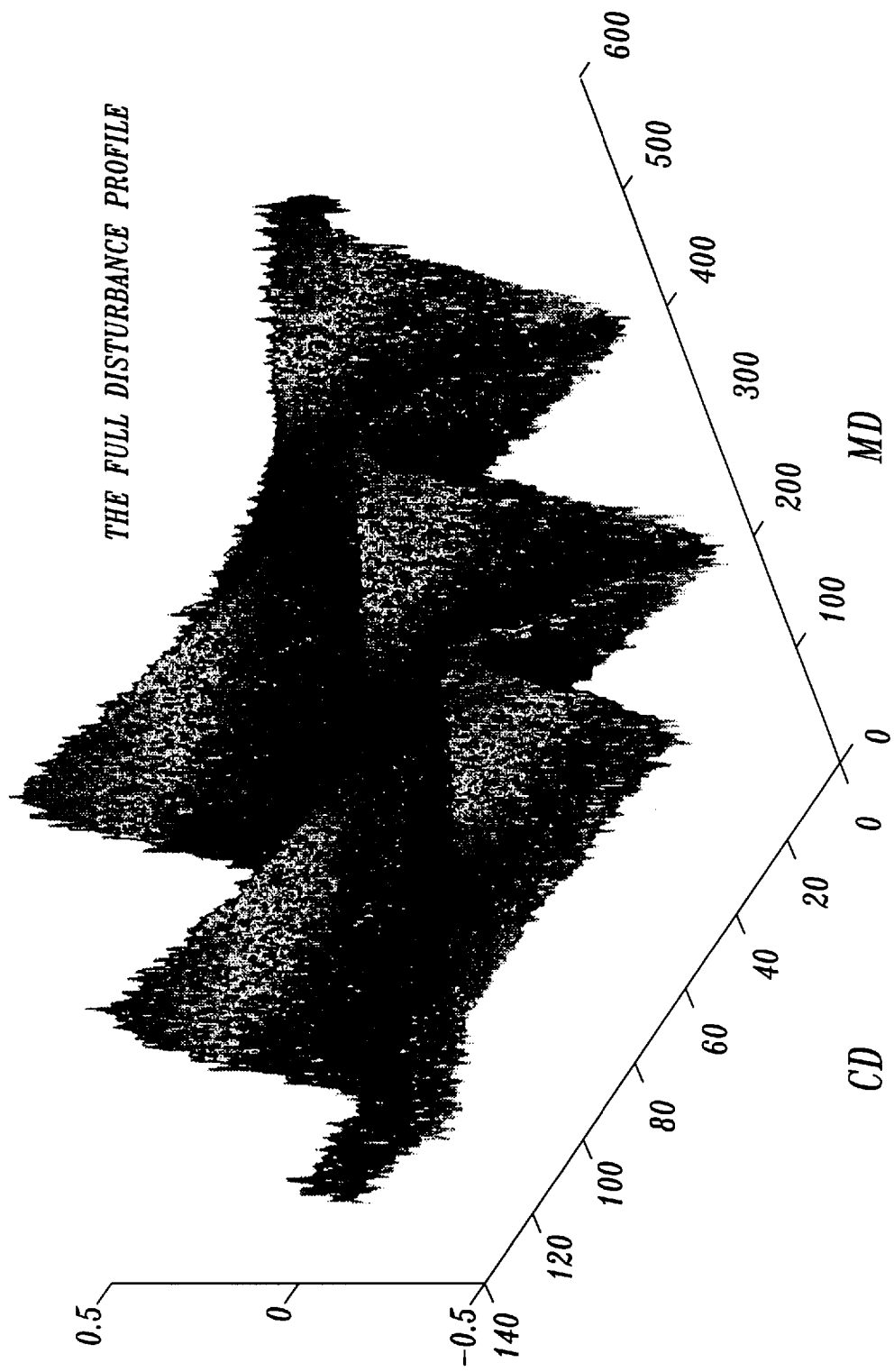
FIG. 8 is a sample disturbance profile for a simulated control system made in accordance with the present invention.

The full profile disturbance $$y_{d_{t'}}^N$$

consists of 125 CD and 490 MD positions (or sampling times) and is plotted in FIG. 8. Note that the profile includes a deterministic pattern plus measurement noise with a signal-to-noise ratio equal to five. Also there is no MD component, i.e., spatial average across CD is zero. Recall that the condition number of this system is equal to 1.9453e+05. For the reasons discussed in Example 1, we first choose the dimension of the "conditioned" plant, K, to be 75. Later we will study the sensitivity of closed-loop performance to the value of K. At this point the necessary matrices ($\overline{V}$, $\overline{U}$, $\Sigma^K$) are available from SVD. Next is the analysis of the dominant disturbance modes.

Figure 9A:
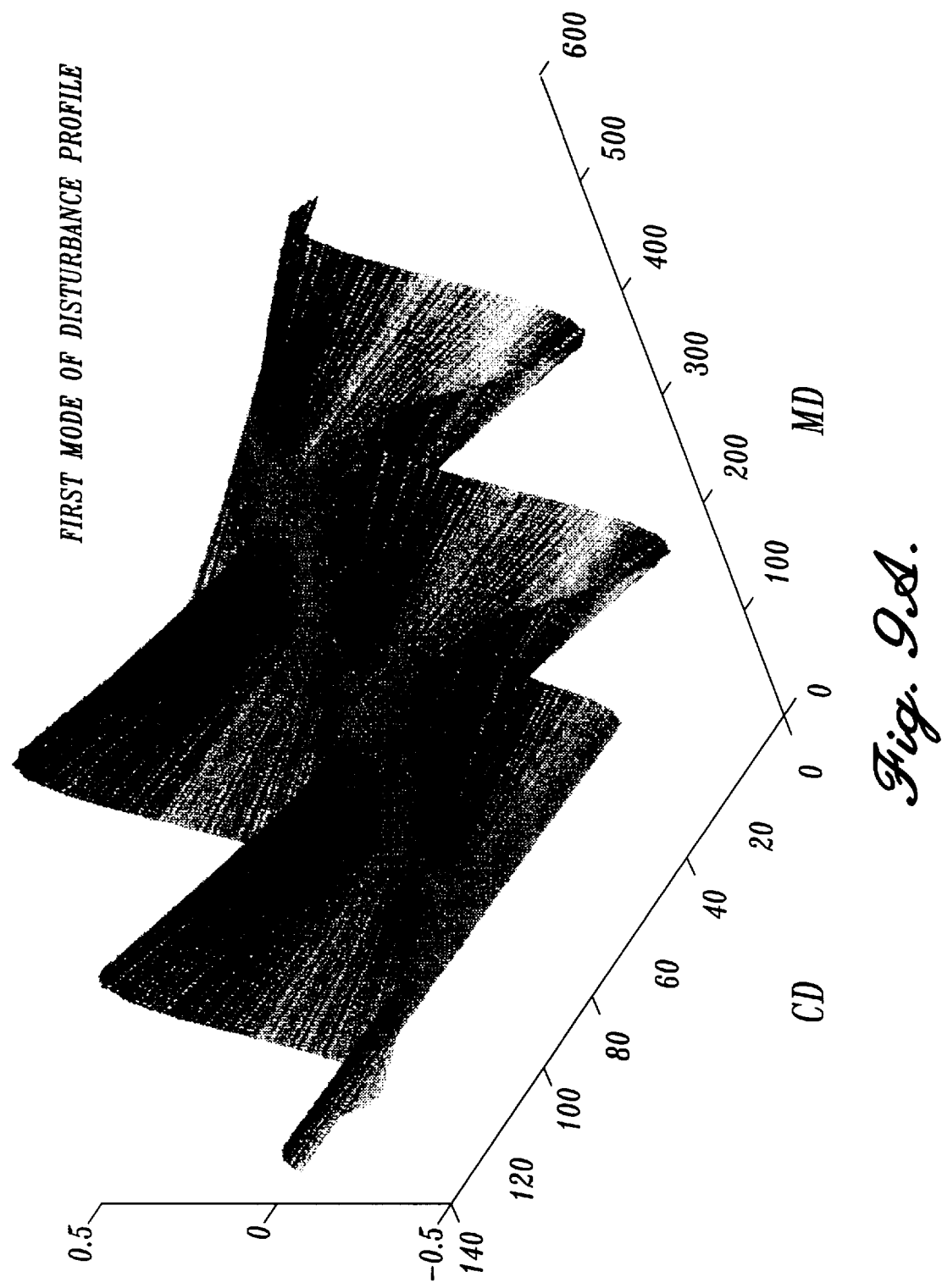
FIGS. 9A–9C illustrate two dominant disturbance modes and a residual disturbance that can effect the operation of the control system.
Figure 9B:
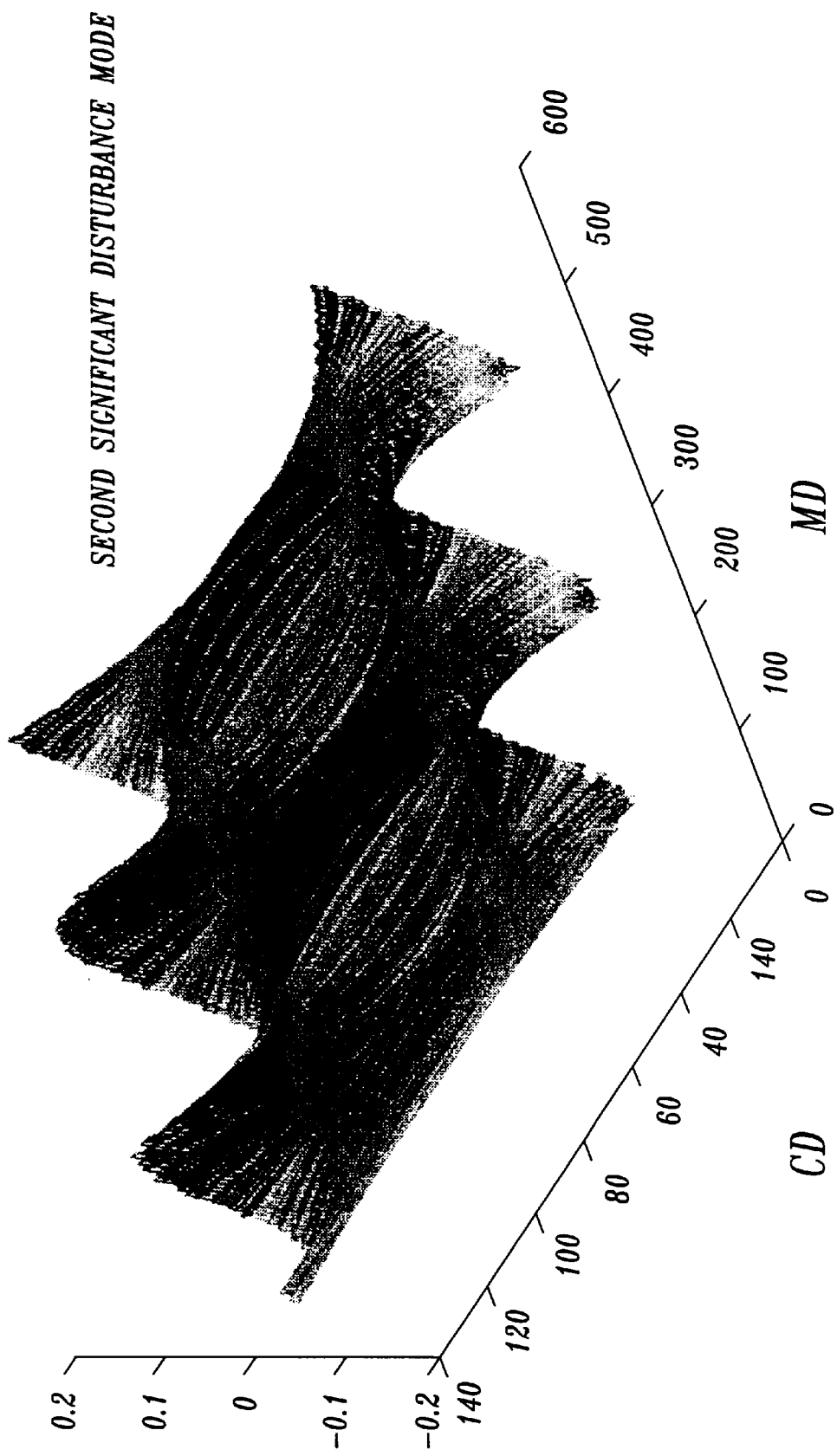
Figure 9C:
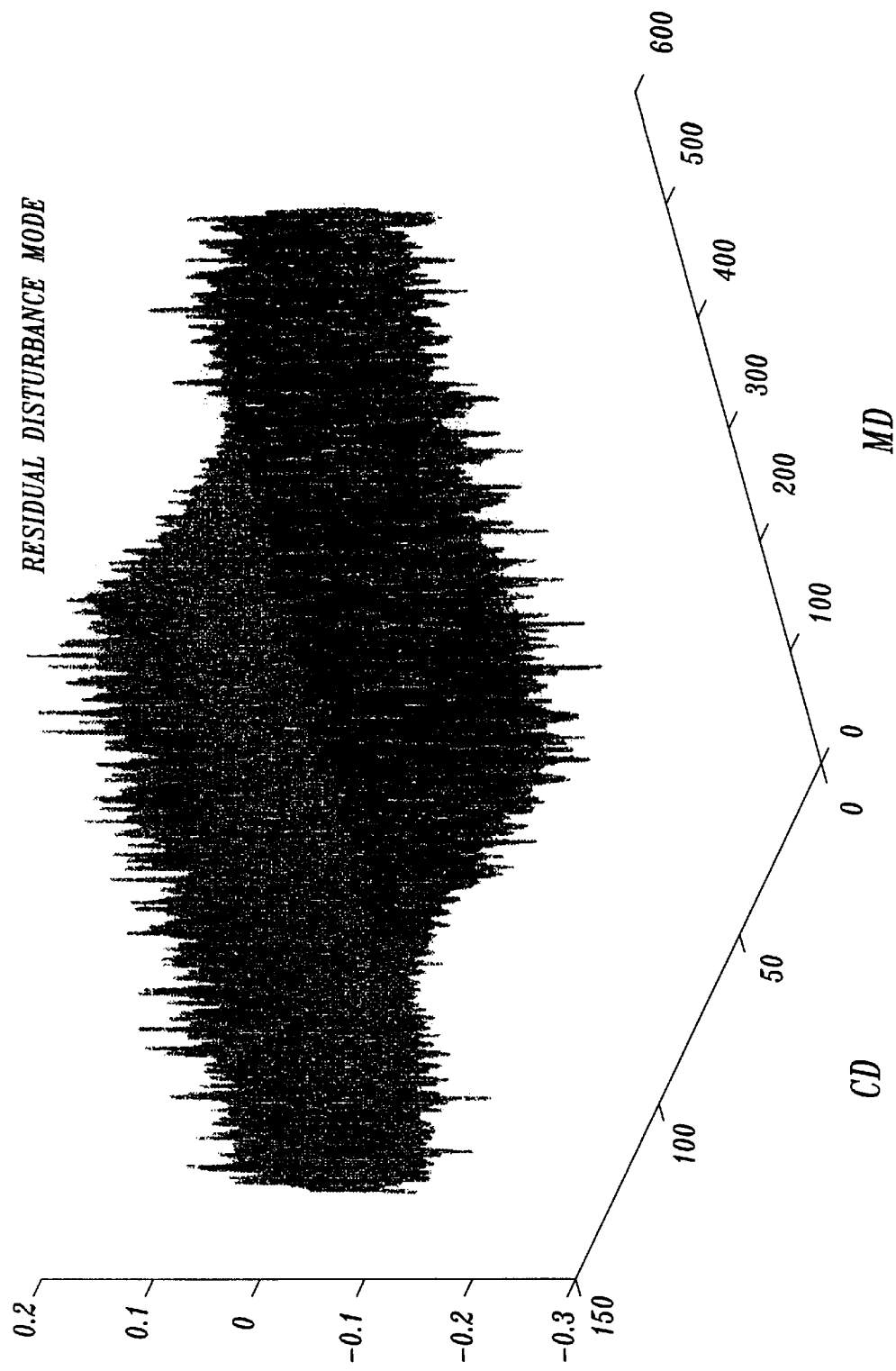

A KL analysis of the disturbance profile $$y_{d_t^N}$$

indicates that two modes explain 98% of total variance. These modes are shown in FIGS. 9A and 9B. The residual 123 modes are mostly noise as shown in FIG. 9C. When KL is implemented on-line with a trailing data window of size W=150, it also picks two modes throughout the simulation. Therefore first we will present results using two disturbance modes. Later we will compare these results with a controller that uses only the first significant mode. Increasing the number of modes beyond two does not improve closed-loop performance since one starts modeling the noise. From the KL analysis we obtain the spatial eigenvectors $\Phi$ to construct the output transformation $Y=(\Phi^T\Phi)^{-1}\Phi^T$. Performing a similar KL analysis on the control input profile as in (18) also suggest two dominant modes throughout the simulation and increasing the number of modes makes the controller respond to noise which is not desired. Therefore the input dimension L of the controller design subspace is chosen as two as well, resulting in a 2×2 IMC controller. This dramatic reduction in dimension (from 125 to 2) is a typical characteristic of paper machines because of the strong correlations that can exist among the CD positions (Rigopoulos et al. 1996b). From the KL analysis on the control input we get the spatial eigenvectors $\Psi$ for the input transformation. The IMC model for controller design then becomes $(Y\Sigma^K\Psi)g(q^{-1})$. Finally it should be noted that the controller is still adaptive although we have fixed the number of modes. The numerical values of the IMC model $(Y\Sigma^K\Psi)$ are computed on-line based on the window of data available at each sampling time.

Figure 10:
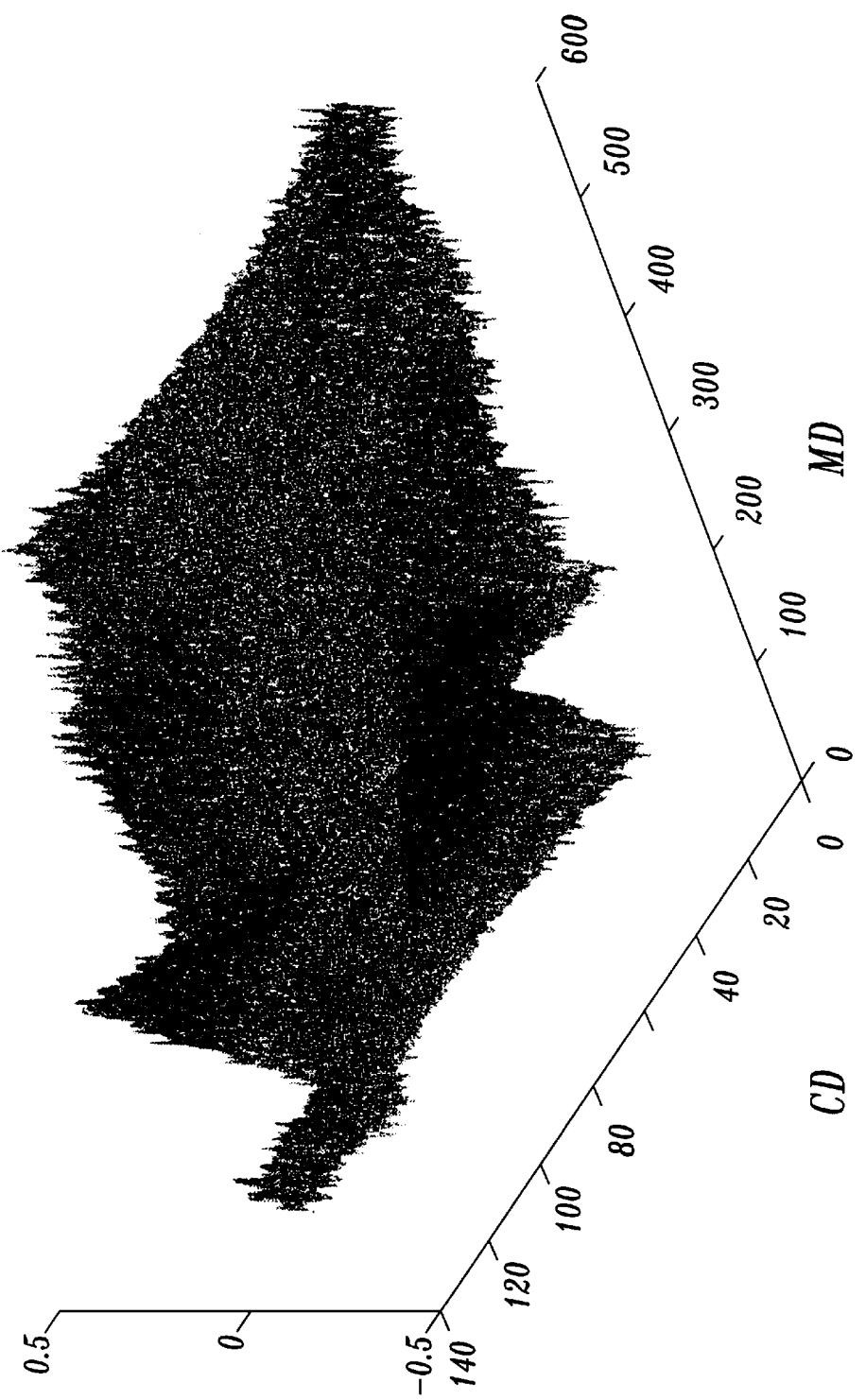
FIG. 10 illustrates an output profile produced by the simulation of the control system according to the present invention.
Figure 11A:
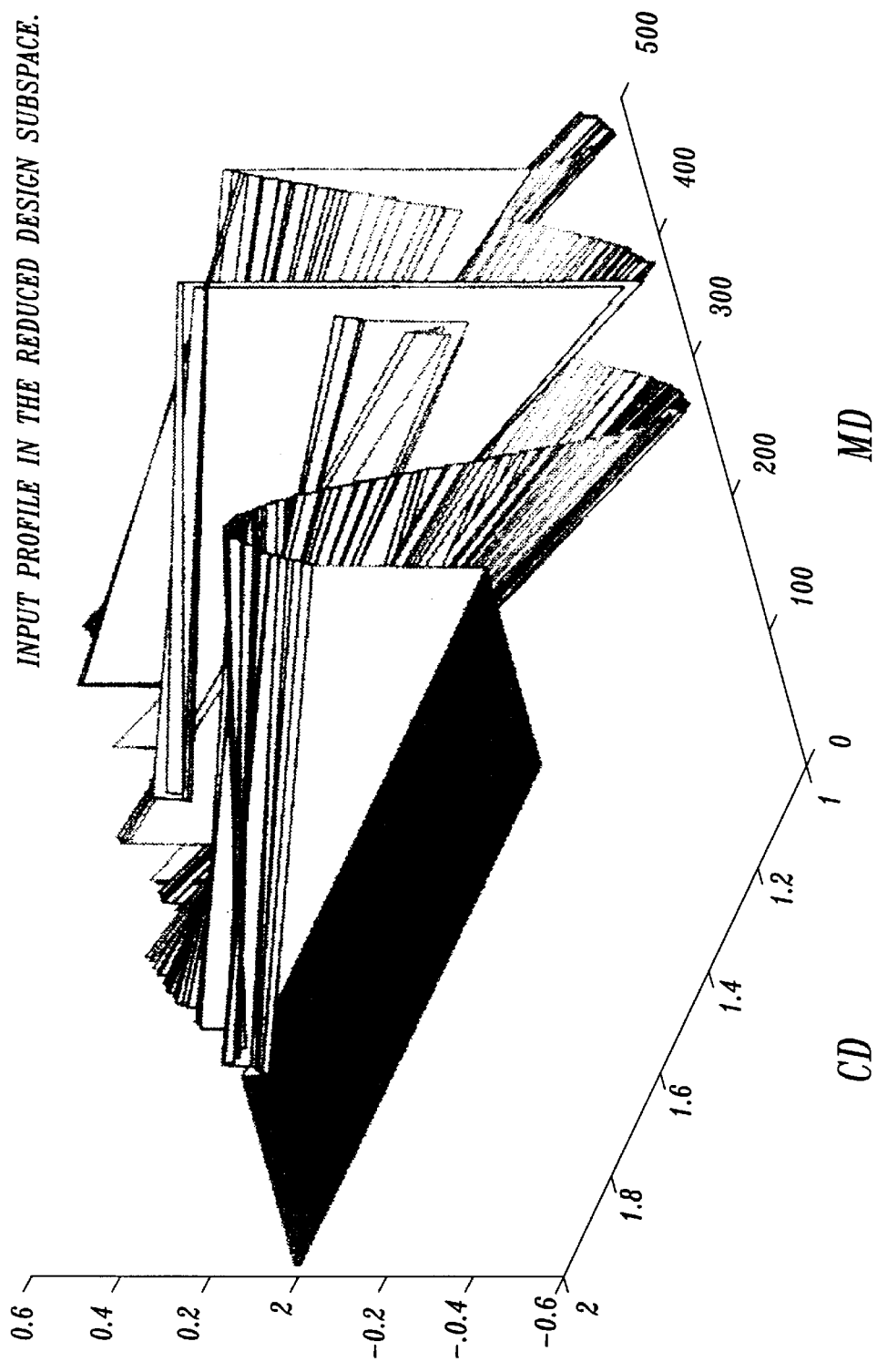
Figure 11B:
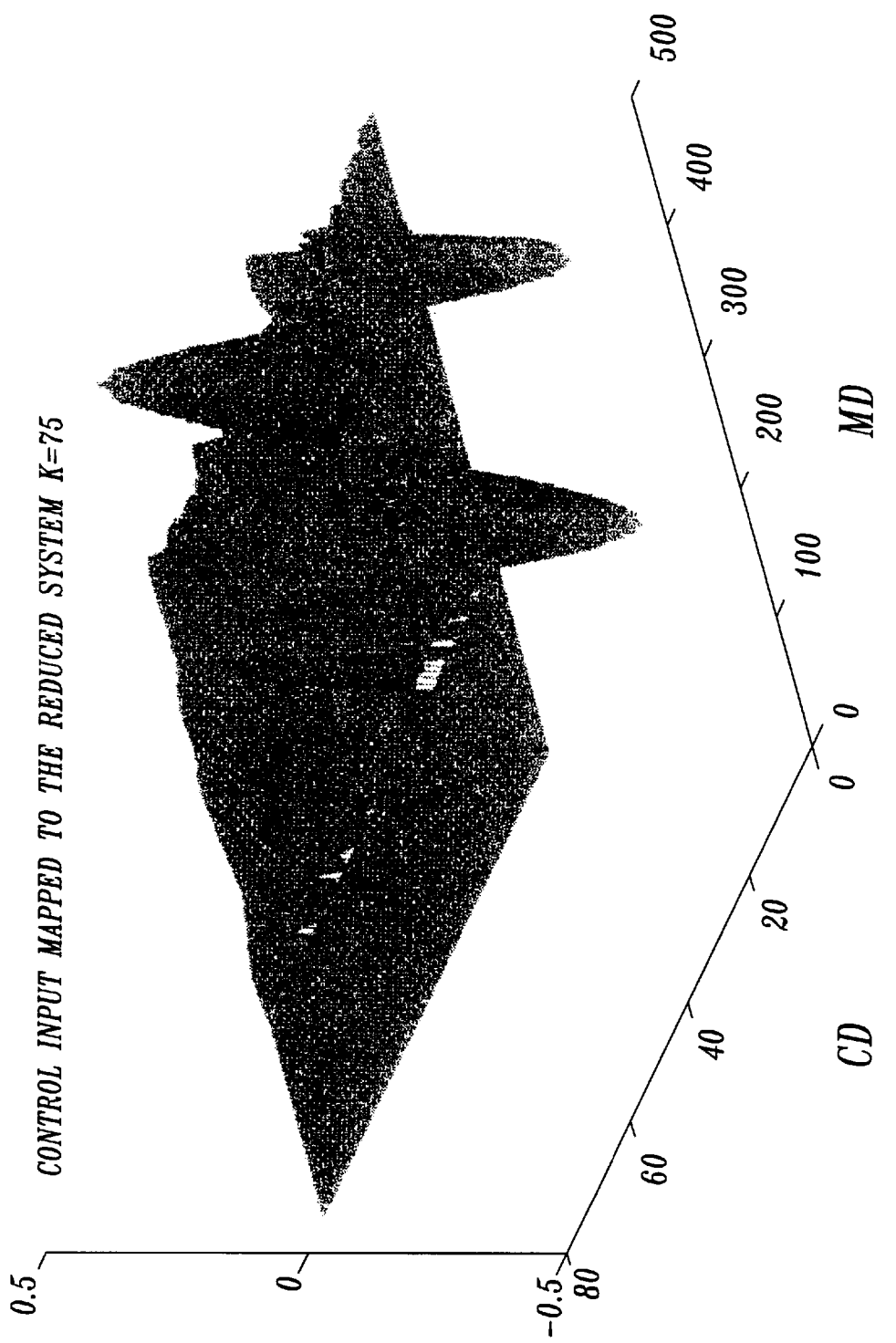
Figure 12A:
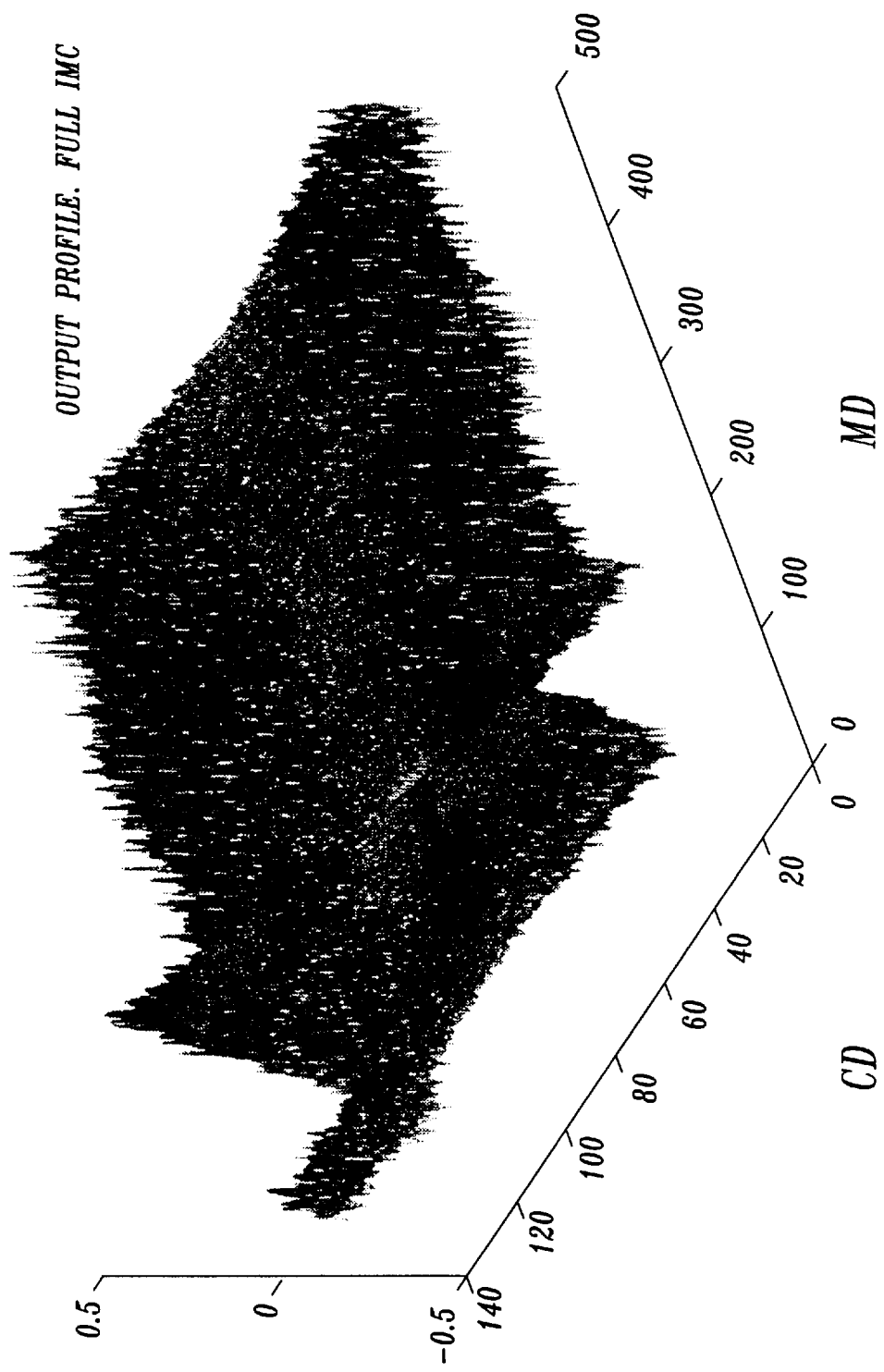
FIGS. 12A–12B show the simulation results of the control signals produced in accordance with the full scale internal model controls as described in FIG. 2.
Figure 12B:
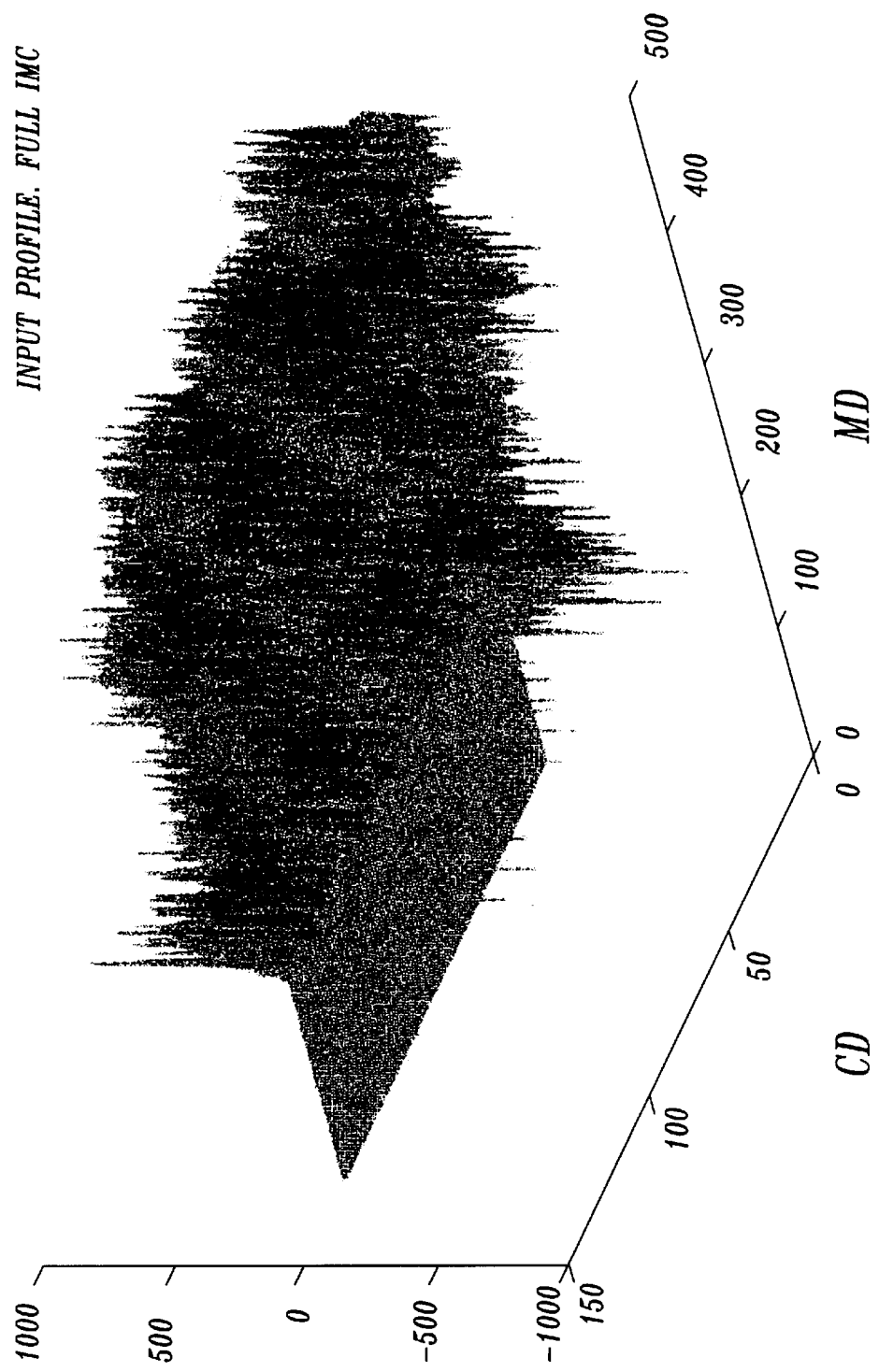

Implementation of the above controller results in the output profile shown in FIG. 10. The first 150 MD positions represent a warm-up period during which open-loop data are collected for the trailing window. After this period we see that closed-loop performance which can be compared with FIG. 8. FIG. 11 shows how the input profile has evolved from $u^L$ designed by IMC in the lowest dimension to the actual input $u^N$ through successive mappings. For comparison we also implemented a full order 125×125 IMC controller in the form of Equation 3. The results are shown in FIG. 12. The controller is very aggressive resulting in unacceptable input magnitudes due to full inversion of the ill-conditioned gain matrix G. The classical approach to this problem in the literature has been to penalize the control action either via constraints or weights and approximately invert G by a Quadratic Program (QP) (e.g., Boyl, 1977; Chen and Wilhem, 1986). Here we have taken a different approach and computed the unconstrained control action in a very small well-conditioned subspace determined naturally by the dominant disturbance modes. The advantage of the present approach would be more pronounced when it is implemented in a Model Predictive Control framework with constraints where reduced order models will be used for prediction and on-line constrained optimization.

Figure 13A:
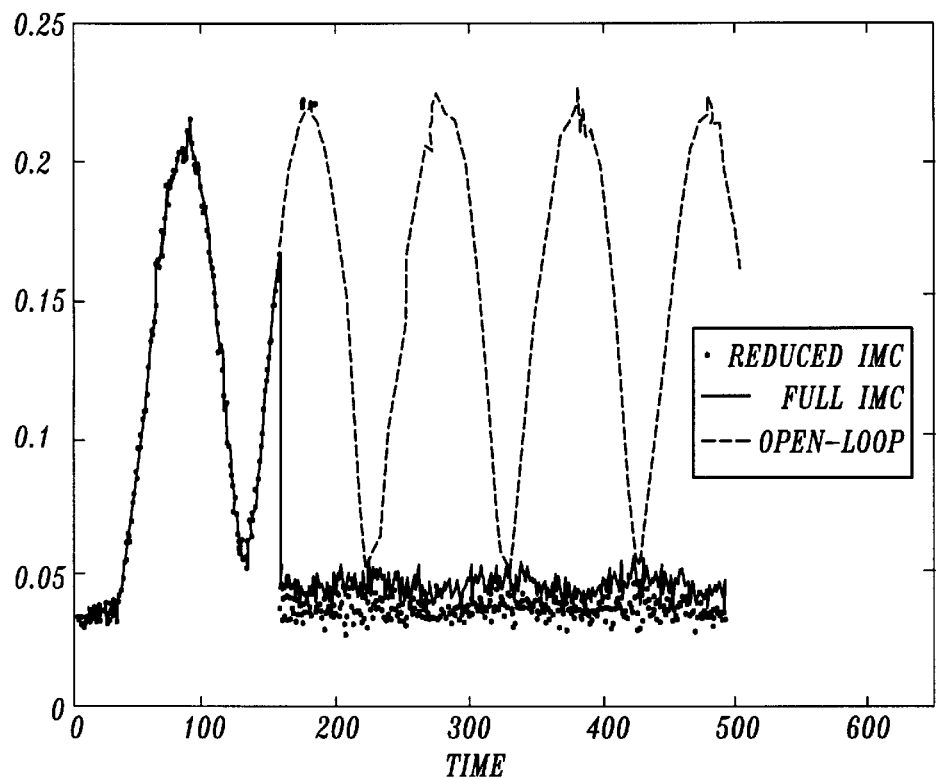
FIGS. 13A–13B illustrate the comparisons of the simulated results of the standard deviation of a full cross-directional profile with and without measurement noise.
Figure 13B:
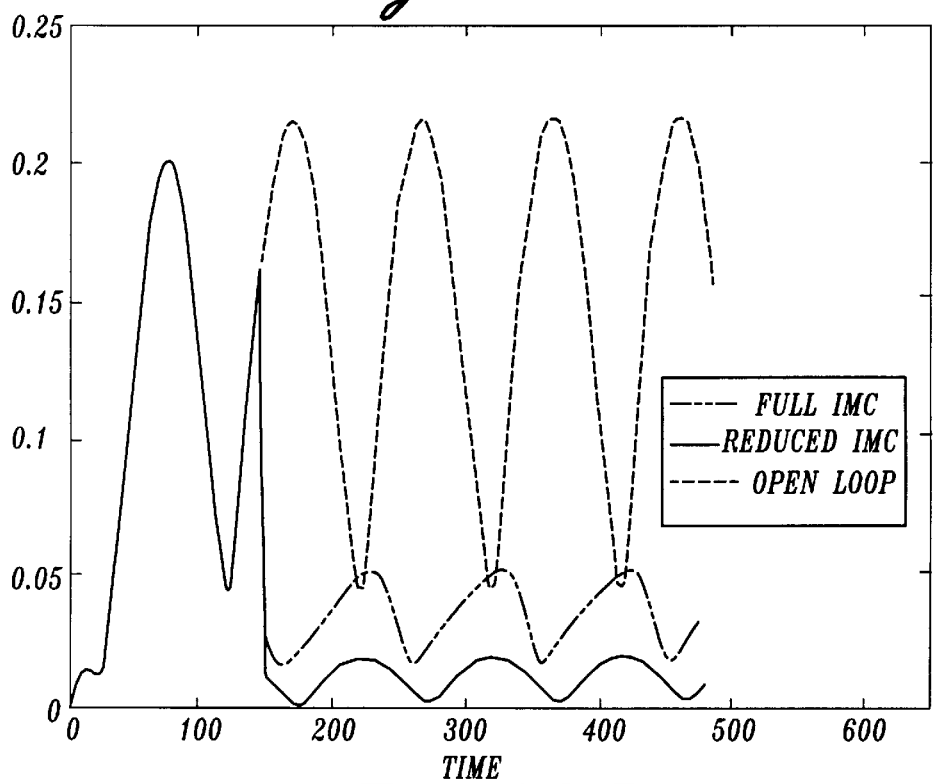

Close inspection of the output profile obtained by the full IMC controller reveals that it is noisier than that of the reduced-order controller. In FIG. 13A this is more clearly shown by the standard deviation of the CD profile. IMC's output performance is slightly worse since it is not optimally tuned to filter the noise whereas projection of the disturbances to a lower dimensional subspace effectively achieves filtering and rejects the dominant disturbances. A first-order filter $$f(q^{-1}) = \frac{1-b}{1-bq^{-1}}$$

was added to the IMC controller and tuned (b=0.4) to give the best trade-off between disturbance rejection and noise suppression. The performance improved only slightly and was still found to be inferior to that of the reduced order controller. In the absence of measurement noise, the output performance of the full IMC is better than that of the reduced order controller as expected (see FIG. 13B). However the control inputs are still unacceptable.

Figure 14:
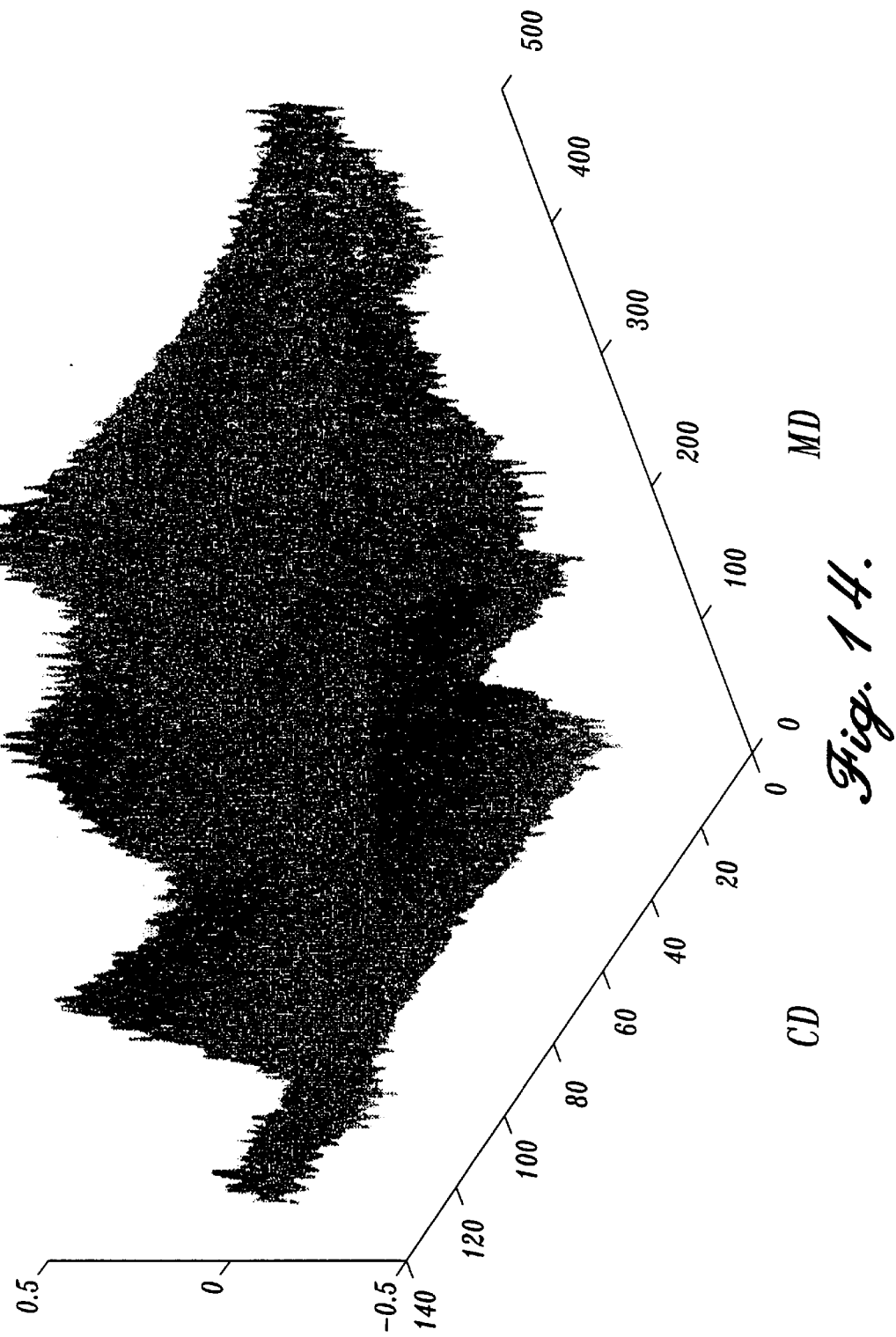
FIG. 14 illustrates the simulated closed-loop output profile of a controller designed only for a first significant disturbance mode.
Figure 15:
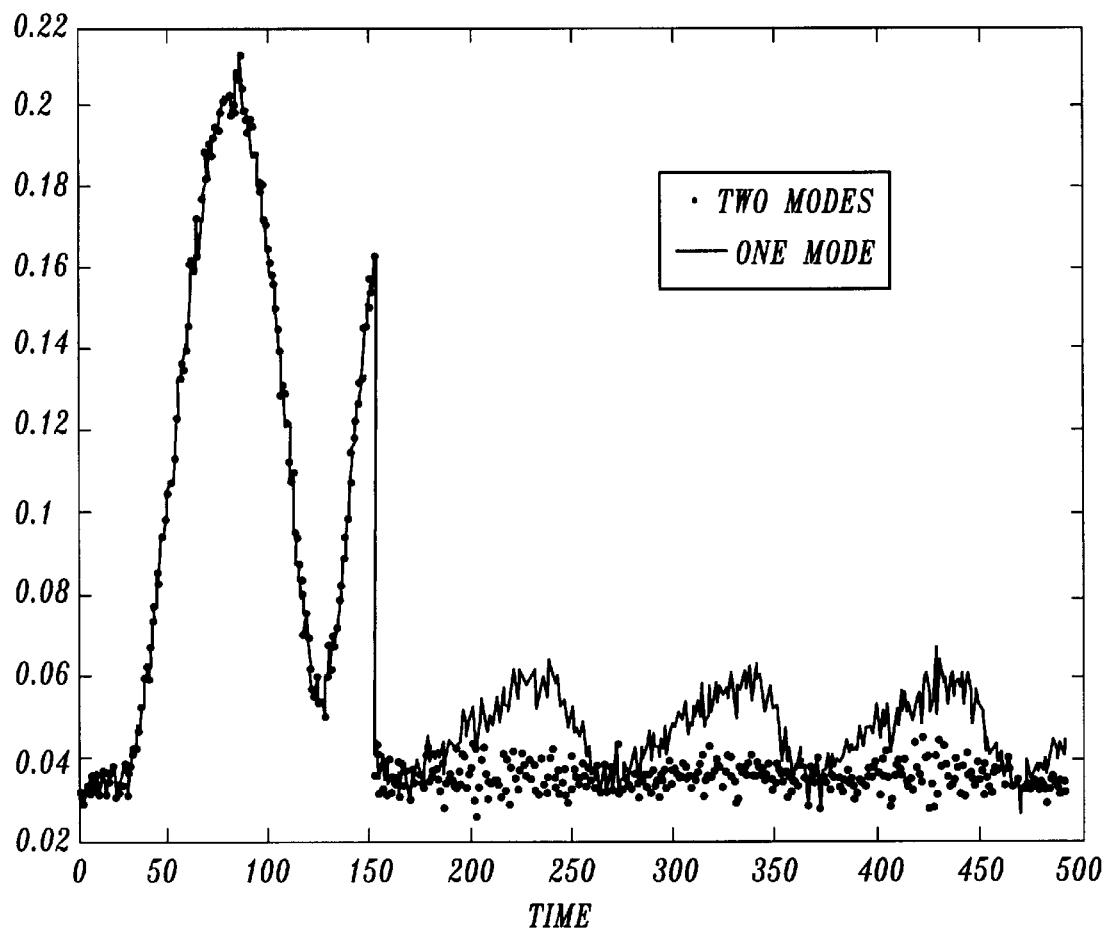
FIG. 15 is a graph comparing the simulated standard deviation of a full cross-dimensional profile under one and two-mode controllers.
Figure 16:
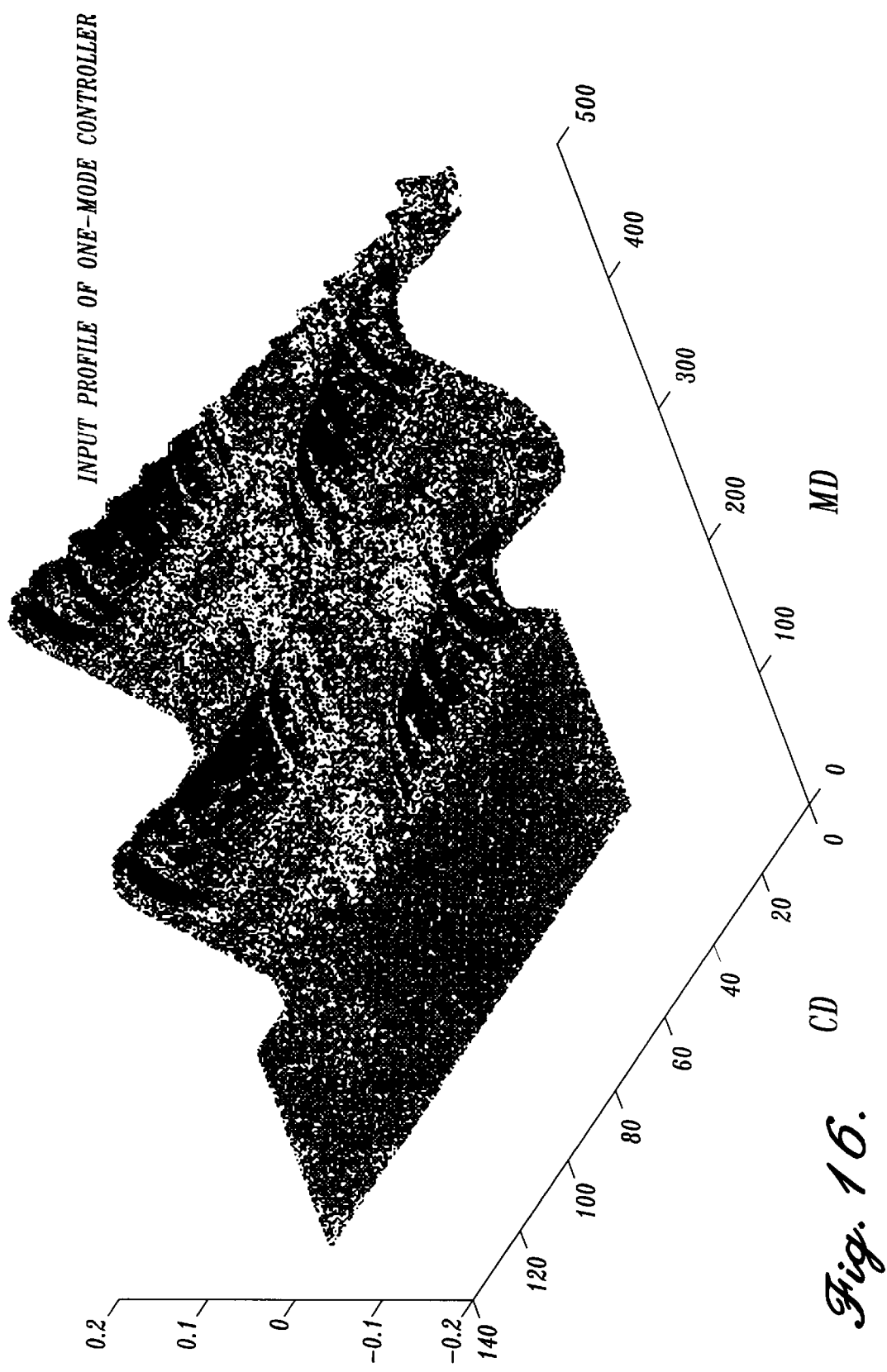
FIG. 16 is a graph illustrating an input profile of a one-mode controller as mapped onto the full scale of the process.

Next we design the controller using only the first significant disturbance mode. The closed-loop output profile is shown in FIG. 14. Comparing the profile with FIGS. 9B and 10, it is clear that the second significant mode is uncontrolled as it shows up on the output profile. Performance deterioration is also seen in the standard deviations given by FIG. 15. It is also interesting to study the control input profile shown in FIG. 16. The smooth transition of the CD input profile from one edge to the other which exists in the two-mode controller (see FIG. 11) is missing in the one-mode controller since it does not respond to the second disturbance mode.

Figure 17:
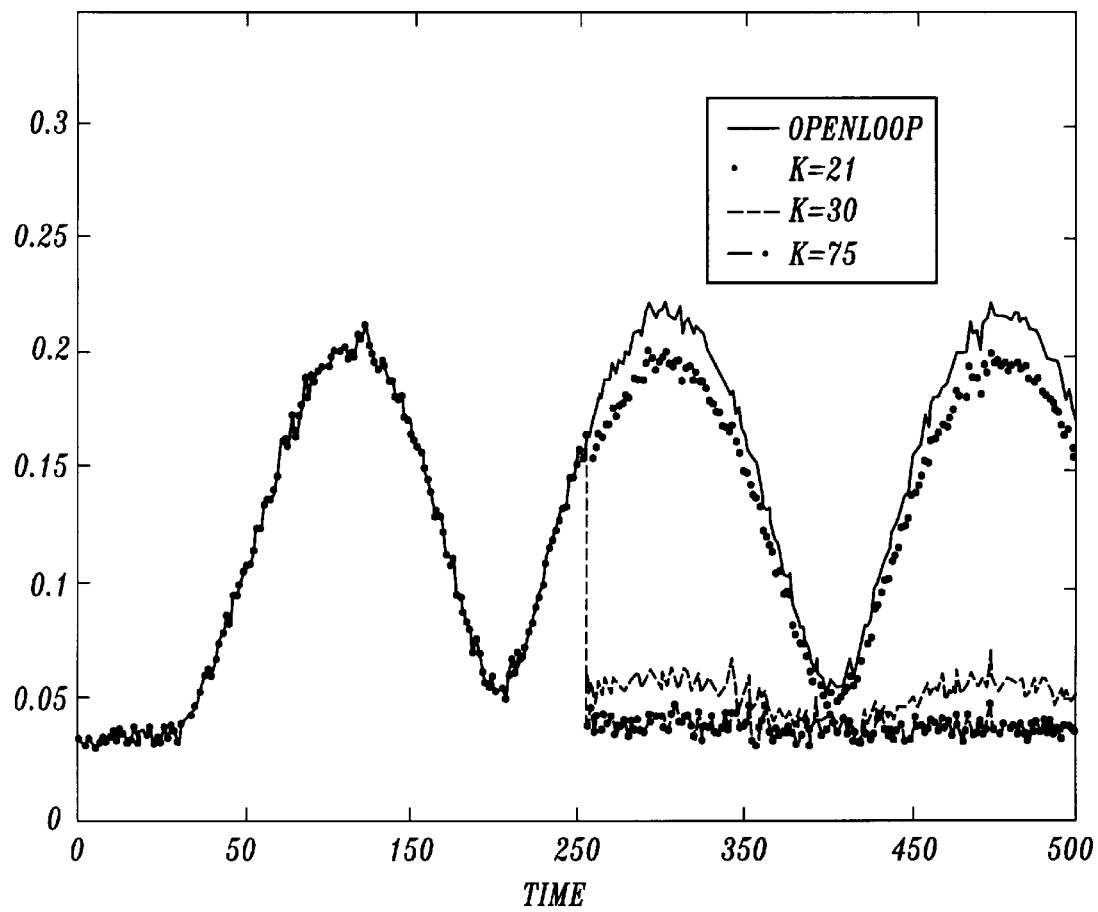
FIG. 17 is a graph illustrating the simulated effect of the size on the conditioned plant K on performance.

Finally the effect of the size of the "conditioned" plant, K, on performance is analyzed as shown in FIG. 17. Note that in the above simulations we have used K=75. consistent with the RRE prediction, the closed-loop performance starts deteriorating as we choose K to be smaller than 75 by deleting more and more singular values and directions. Revisiting the RRE plot (FIG. 6) one observes a significant change in slope around K=25. It is interesting to note that for values of K smaller than 25, the closed-loop performance deteriorates very quickly and approaches open-loop performance as shown in FIG. 17. Values of K larger than 75 are not presented as they do not bring out any appreciable improvement but increase the computation time.

Comparison With Other Similar Works

The basic idea of designing low order controllers using modal analysis is not a new concept in itself as it has been discussed in several other papers. What makes the proposed method different is the way we perform the dimensionality reduction based on significant disturbance modes and implement the controller design on-line in an adaptive fashion. To the best of our knowledge these features have not appeared elsewhere. In order to put the present work in perspective, we will constrast it qualitatively with some of the earlier studies.

Roffel et al. (1989) used PCA and partial least squares to reduce the dimensionality of the identification and control problems. PCA was implemented off-line to output measurements obtained under closed-loop identification to select the most significant controlled variables. The selection of a reduced set of inputs was done based on the operator's experience. They applied their approach to a polymerization reactor with three outputs and inputs. Identification of significant disturbance and control input modes were not addressed. Their method defines a reduced input-output space to facilitate the identification of the input-output model while we start form an already identified input-output model and focus on a reduced order controller for disturbance rejection. Therefore the two studies complement each other. In an earlier work by Jutan et al. (1977) the authors used PCA to identify a reduced order stochastic disturbance model. However they did not present a reduced order controller design approach, although it was suggested in their conclusions.

The works of Gay and Ray (1988 and 1995) present a reduced order feedback design for distributed parameter systems (DPS). both the distributed inputs and outputs are approximated by truncated series expansions and the controller is designed in the finite dimensional space of the coefficients of expansions using an SVD controller. The basis functions are chosen a priori and fixed as piecewise constant or parabolic B-splines; they are not determined from data as in the present work. Identification of significant disturbance modes is not an issue; consequently on-line controller adaptation is not treated. Output projection is performed on the error between the measured output and the desired setpoint instead of the model-plant mismatch used in our approach. In a later publication on control of chaotic behavior in DPS (Chakravarti et al. 1995), the authors adopt the modal controller of Gay and Ray and compute the significant output modes by applying Karhunen-Loeve expansion to data. However in their low order controller they use the output modes for input modes as well and do not study disturbance rejection and controller adaptation.

Piovoso and Kosanovich (1994) has proposed a PCA controller in which the effect of process upsets on primary variables are controlled in reduced dimension score or principal components space by controlling secondary measurements. The controller is a steady state controller and does not include on-line identification of disturbance and control input modes.

None of the above studies are concerned directly with the sheet forming processes. The recent work of Kristinsson and Dumont (1996) is motivated by the same problems discussed in this paper. For paper machines they approximate both the CD profile and the slice lip deflection using orthogonal Gram polynomials. Subsequently the controller design is performed in the reduced space of the parameters of these polynomials. The basis functions are not determined from data as in the KL expansion. The dimension of the controller is not deduced from significant disturbance modes and controller adaptation is not addressed.

In summary, although there exist other important works in the literature which have similar control objectives, the technical details of the control system design and the end application of the present work differ significantly from these studies.

Conclusions

We presented a novel design approach for controlling full CD profiles in sheet forming processes. The method designs the controller in a reduced order subspace directly determined by the significant disturbance modes one wants to reject. This way the problems associated with large dimensions and ill-conditioning are alleviated. The significant modes are identified on-line using an adaptive PCA algorithm and the controller adapts to changing modes. In this paper we designed an unconstrained IMC controller so that we could focus on the ideas of projection and order reduction without further complicating the analysis. Extension of this method to design constrained controllers within the framework of Model Predictive Control is currently under progress.

---

Acknowledgments
The authors gratefully acknowledge the financial support of the Weyerhaeuser Company

---

Notation

| | |
|---|---|
| $a_n =$ | n-th temporal mode of the Karhunen-Loeve expansion |
| $b =$ | IMC filter constant |
| $d^{(i)} =$ | i-th disturbance mode |
| $d^L =$ | vector of L significant disturbance modes |
| $d_{res}^{K-L} =$ | vector of K-L residual disturbance modes |
| $E =$ | total mean energy |
| $f =$ | IMC filter |
| $g =$ | transfer function |
| $G =$ | steady-state gain matrix of the original plant |

---

Acknowledgments
The authors gratefully acknowledge the financial support of the Weyerhaeuser Company

| | |
|---|---|
| $\hat{G} =$ | effective steady-state gain matrix of the original plant |
| $K =$ | size of the "conditioned" plant |
| $k =$ | sampling time or MD position |
| $K =$ | Correlation matrix used in PCA |
| $K_c =$ | Controller gain matrix |
| $L =$ | number of significant disturbance modes |
| $m =$ | number of significant control input modes |
| $N =$ | number of CD positions (lanes or boxes) and actuators |
| $Q =$ | number of MD positions |
| $q^{-1} =$ | backward shift-operator |
| $RRE =$ | relative reduction error |
| $U =$ | matrix of left singular vectors of G |
| $\overline{U} =$ | matrix of K left singular vectors of G |
| $u^{(i)} =$ | i-th control input mode |
| $u =$ | vector of control inputs |
| $u^M =$ | vector of M significant control input modes |
| $u_{res}^{K-M} =$ | vector of K-M significant control input modes |
| $V =$ | matrix of right singular vectors of G |
| $\overline{V} =$ | matrix of K right singular vectors of G |
| $W =$ | window size used in the KL expansion |
| $Y =$ | output transformation matrix |
| $y =$ | vector of outputs |
| $y_d =$ | vector of disturbance effects on the outputs |
| $Z =$ | data matrix |
| $\overline{Z} =$ | time-averaged data matrix used in PCA |

Greek letters

| | |
|---|---|
| $\overline{\sigma} =$ | maximum singular value |
| $\Sigma =$ | matrix of N singular values of G |
| $\Sigma^K =$ | matrix of K singular values of G. Steady-state gain matrix of the "conditioned" plant |
| $\Sigma^{N-K} =$ | matrix of N-K singular values of G |
| $\lambda_n =$ | n-th eigenvalue of the KL expansion |
| $\zeta^{(n)} =$ | n-th eigenvector or spatial mode of for a general KL expansion |
| $\phi^{(i)} =$ | i-th eigenvector or spatial mode of disturbances given by the KL expansion |
| $\Phi =$ | matrix containing the significant spatial modes of disturbances |
| $\Phi_{res} =$ | matrix containing the residual spatial modes of disturbances |
| $\psi^i =$ | i-th eigenvector or spatial mode of control inputs given by the KL expansion |
| $\Psi =$ | matrix containing the significant spatial modes of control |
| $\Psi_{res} =$ | matrix containing the residual spatial modes of control inputs |

Subscripts

| | |
|---|---|
| $t =$ | time |
| $res =$ | residual |
| $+ =$ | non-minimum-phase |
| $- =$ | minimum phase |

Superscripts
All superscripts on vectors show the vector size

| | |
|---|---|
| $T =$ | transpose |
| $\dagger =$ | pseudo-inverse |

Literature Cited anon.,—"Gauging System Gives Small Converter a Big Edge", Converting Magazine, pp. 44–48, 1993.

Berkooz, B. and Holmes, P. and Lumley, J. L "The Proper Orthogonal Decomposition in the Analysis of Turbulent Flows", Ann. Rev. Fluid Mech. 25: 539–575, 1993.

Boyle, T., "Control of Variations in Web Forming Processes", The Canadian J. of Chem. Engng. 55:457–461, 1977.

Braatz, R. D., Tyler, M. L., Morari, M., Pranchk, R. F. and Sartor, L., "Identification and Control of Cross-Directional Control of Coating Processes", AICHE J. 38(9): pp. 1329:1339, 1992.

Chakravarti, S., Marek, M. and Ray, W. H., "Reaction-diffusion System with Brusselator Kinetics: Control of a Quasiperiodic Route to Chaos," Physical Review E. 52(3): 2407:2423, 1995.

Chen, C.-C. and Chang, H. C., "Accelerated Disturbance Damping of an Unknown Distributed System by Nonlinear Feedback", AICHE J. 3 8 (9): 1461–1476,1992.

Chen, S.-C. and Wihelm, R. R., "Optimal Control of Cross-Machine Direction Web Profile with Cobstraints on the Control Effort," ACC Proceedings, 1986.

Francis, K., Kleinsmith, D. and Stenbak, M., "The Stationary Bone-Dry Weight Sensor", Engineering Conference. Tappi:Proceedings. pp. 561–567, 1988.

Gay, D. H. and Ray, W. H., "Application of Singular Value Methods for Identification and Model Based Control of Distributed Parameter Systems", IFAC Symp. on Model-Based Control. Atlanta, 1988.

Gay, D. H. and Ray, W. H., "Identification and Control of Distributed parameter Systems by Means of the Singular Value Decomposition", Che. Eng. Sc. 50(10):1519–1539, 1995.

Jutan, A., MacGregor, J. F. and Wright, J. D., "Pat 11. data Collection, Parameter Estimation, and Stochastic Disturbance Identification", AICHE J. 23(5): 742–750, 1977.

Karhunen, K., "Uber lineare methoden in der wahrscheinlichkeitsrechnung", Ann. Acad. Sci. Fenn. Ser. A, I. Math. Phys. 37:79, 1947.

Krischer, K., Rico-Martinez, R., Kevrekidis, I. G., Rotermund, H. H., Ertl, G. and Hudson, J. L. "Model Identification of a Spatiotemporally Varying Catalytic Reaction", AICHE J. 39(1):89–89, 1993.

Kristinsson, K. and Dumont, G., "Cross-directional Control of Paper Machines using Gram Polynomials," Automatica. 3 2 (4):pp 533–548, 1996.

Laughlin, D. L., Morari. M. and Braatz, R. D., "Robust Performance of Cross-directional Basis-Weight Control in paper Machines", Automatica. 29:1395–1410, 1993.

Loeve, M. M., *Probability Theory,* The University series in higher mathematics", edn 3, Princeton, N.J., Van Nostrand, 1963.

Morari, M. and Zafiriou, E., Robust Process Control, Prentice Hall, 1989.

Ogawa, H. and Oja, E., "Projection Filter, Wiener Filter, and Karhunen-Loeve Subspaces in Digital Image Restoration", J. Math. Anal. Appl. 114:37–517 1986.

Par, H. M. and Cho, D. H., "The Use of the Karhunen-Loeve Decomposition for the Modeling of Distributed Parameter Systems", Chem. Eng. Sci. 51(i):81–98, 1966.

Piovoso, M. J. and Kosanovich, K. A., "Applications of Multivariable Statistical Methods to Process Monitoring and Controller Design", Int. J. Control. 59(3):743–765, 1994.

Rigopoulos, A., Arkun, Y. and Kayihan, F., "Control Relevant Disturbance Modeling of Paper Machine Full Profile Properties Using Adaptive PCA", Control Systems '96 Preprints, Halifax, Nova Scotia, Canada. pp. 35–39, 1996a.

Rigopoulos, A., Arkun, Y. and Kayihan, F., "Identification of Fun Profile Disturbance Models for Sheet Forming Processes," AIChE J, submitted, 1996b.

Roffel, J. J., MacGregor, J. F. and Hoffman, T. W., "The Design and implementation of a Multivariable Internal Model Controller for a Continuous Polybutadiene Polymerization Train", DYCORD'89, Maastricht, The Netherlands, pp. 9–15, 1989.

Savoji, M. H. and Burge, R. E., "On Different Methods Based on the Karhunen-Loeve Expansion and Used in Image Analysis", Comp. Vision, Image and Signal Proc. 29(2):259–269, 1985.

Sirovich, L. and Everson, R., "Management and Analysis of Large Scientific Datasets", Int. J. Supercomputer Appl. 6(1):50–68, 1992.

Taylor, Bruce F. "Optimum separation of machine-direction and cross-direction product variations. The scanning measurement challenge", Tappi J. pp. 87–92, 1991.

Wilhelm, R. G. and Fjeld, M. "Control Algorithms for Cross Directional Control: The State of the Art". Proceedings of the 5th International IFAC/R4ECO Conference on Instrumentation in the Paper, Rubber, Plastics and Polymerization Industries, Antwerp, Belgium. pp. 163–174, 1983.

Wilhelm, R. G. "On the Controllability of Cross-Direction Variations of Sheet Properties", Engineering Conference, Proceedings of the Technical Association of the Pulp and Paper Industry. pp. 621–629, 1984.

While the preferred embodiment of the invention has been illustrated and described, it will be appreciated that various changes can be made therein without departing from the spirit and scope of the invention. The scope of the invention is therefore to be determined solely from the following claims and equivalents thereto.

The embodiments of the invention in which an exclusive property or privilege is claimed are defined as follows:

1. A control system for controlling the operation of a machine or process, comprising:

a plurality of actuators that receive a set of output control signals in order to control the operation of the machine or process;

a plurality of sensors that produce input sensor signals indicative of the operation of the machine or process;

a processor programmed to produce the control signals from the sensor signals by:

creating an input vector of difference signals by subtracting a number of input sensor signals from a number of output signals created by a fixed model of the machine or process;

storing a sequence of prior input vectors;

reducing the number of input signals produced by the plurality of sensors based on a singular value decomposition of the fixed model of the machine or process and on a principal component analysis of the stored sequence of prior input vectors;

applying the reduced number of input signals to a reduced order controller, that is a function of the principal component analysis to calculate a reduced number of output control signals; and increasing the number of output control signals based on the principal component analysis of the stored sequence of prior input vectors and the singular value decomposition in order to create the set of output control signal supplied to the actuators.

2. The control system of claim 1, wherein the reduced order control system comprises:

a control algorithm that produces the reduced number of output control signals from the reduced number of input signals;

a reduced order effective process model of the control algorithm that receives the reduced number of output control signals and produces output signals indicative of an expected operation of the machine or process; and a differencing circuit that determines the difference between the reduced number of input signals and the output signals produced by the reduced order effective process model wherein an output of the differencing circuit is applied as the inputs to the control algorithm.

* * * * *